(12) United States Patent
Demiralp et al.

(10) Patent No.: US 11,570,276 B2
(45) Date of Patent: Jan. 31, 2023

(54) FORECASTING REQUESTS BASED ON CONTEXT DATA FOR A NETWORK-BASED SERVICE

(71) Applicant: Uber Technologies, Inc., San Francisco, CA (US)

(72) Inventors: Emre Demiralp, San Francisco, CA (US); John Mark Nickels, San Francisco, CA (US); Eoin O'Mahony, San Francisco, CA (US); Danhua Guo, San Francisco, CA (US); Lior Seeman, San Francisco, CA (US); Chaoxu Tong, San Francisco, CA (US); Melissa Dalis, San Francisco, CA (US); Hyung Jin Kim, San Francisco, CA (US); En Yu, San Francisco, CA (US); Xiangyu Sun, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 16/746,694

(22) Filed: Jan. 17, 2020

(65) Prior Publication Data

US 2021/0227049 A1 Jul. 22, 2021

(51) Int. Cl.
*H04L 67/63* (2022.01)
*H04L 67/51* (2022.01)
(Continued)

(52) U.S. Cl.
CPC ............... *H04L 67/63* (2022.05); *G01C 5/06* (2013.01); *G01S 13/882* (2013.01);
(Continued)

(58) Field of Classification Search
CPC .. G06Q 50/30; G06Q 10/06315; G06N 7/005; H04L 67/327
See application file for complete search history.

(56) References Cited

U.S. PATENT DOCUMENTS 5,168,451 A   12/1992   Bolger
5,604,676 A   2/1997    Penzias
(Continued)

FOREIGN PATENT DOCUMENTS

CA   2889853     5/2014
CN   111832788   10/2020
(Continued)

OTHER PUBLICATIONS

Exam Report No. 1 in AU 2015296265 dated Apr. 21, 2020.
(Continued)

*Primary Examiner* — Tonia L Dollinger
*Assistant Examiner* — Ishrat Rashid
(74) *Attorney, Agent, or Firm* — Mahamedi IP Law LLP

(57) ABSTRACT

A network system can communicate with user and provider devices to facilitate the provision of a network-based service. The network system can identify optimal service providers to provide services requested by users. The network can utilize context data in matching service providers with users. In particular, the network system can determine, based on context data associated with a user, whether to perform pre-request matching for that user. A service provider who is pre-request matched with the user can be directed by the network system to relocate via a pre-request relocation direction. When the user submits the service request after the pre-request match, the network system can either automatically transmit an invitation to the pre-request matched service provider or can perform post-request matching to identify an optimal service provider for the user.

20 Claims, 11 Drawing Sheets

(51) Int. Cl.
   *H04L 67/50* (2022.01)
   *G01C 5/06* (2006.01)
   *H04L 67/306* (2022.01)
   *G01S 13/88* (2006.01)
   *H04L 67/62* (2022.01)

(52) U.S. Cl.
   CPC ............ *H04L 67/306* (2013.01); *H04L 67/51* (2022.05); *H04L 67/535* (2022.05); *H04L 67/62* (2022.05)

(56) References Cited

U.S. PATENT DOCUMENTS

| | | | |
|---|---|---|---|
| 5,945,919 | A | 8/1999 | Trask |
| 6,212,393 | B1 | 4/2001 | Suarez |
| 6,356,838 | B1 | 3/2002 | Paul |
| 6,608,566 | B1 | 8/2003 | Davis |
| 6,618,593 | B1 | 9/2003 | Drutman |
| 6,756,913 | B1 | 6/2004 | Ayed |
| 6,925,381 | B2 | 8/2005 | Adamcyzk |
| 6,950,745 | B2 | 9/2005 | Agnew |
| 6,989,765 | B2 | 1/2006 | Gueziec |
| 7,062,376 | B2 | 6/2006 | Oesterling |
| 7,080,019 | B1 | 7/2006 | Hurzeler |
| 7,610,145 | B2 | 10/2009 | Kantarjiev |
| 7,822,426 | B1 | 10/2010 | Wuersch |
| 7,886,019 | B2 | 2/2011 | Srinivasachar |
| 8,140,256 | B1 | 3/2012 | dos-Santos |
| 8,285,571 | B2 | 10/2012 | Demirdjian |
| 8,362,894 | B2 | 1/2013 | Shah |
| 8,412,667 | B2 | 4/2013 | Zhang |
| 8,554,608 | B1 | 10/2013 | O'Connor |
| 8,799,038 | B2 | 8/2014 | Chen et al. |
| 9,070,101 | B2 | 6/2015 | Abhayanker |
| 9,483,744 | B2 | 11/2016 | Ford |
| 9,488,484 | B2 | 11/2016 | Ford |
| 9,552,559 | B2 | 1/2017 | Ford |
| 9,558,469 | B2 | 1/2017 | Ford |
| 9,569,740 | B2 | 2/2017 | Ford |
| 9,599,481 | B2 | 3/2017 | Ford |
| 9,671,239 | B2 | 6/2017 | Ford |
| 9,689,694 | B2 | 6/2017 | Ford |
| 9,715,667 | B2 | 7/2017 | Ford |
| 10,152,053 | B1 | 12/2018 | Smith |
| 10,467,561 | B2 | 11/2019 | Haparnas |
| 10,572,964 | B2 | 2/2020 | Kim |
| 10,721,327 | B2 | 7/2020 | Cheng |
| 11,153,395 | B2 | 10/2021 | Sweeney |
| 11,196,838 | B2 | 12/2021 | Cheng |
| 2001/0037174 | A1 | 11/2001 | Dickerson |
| 2001/0056363 | A1 | 12/2001 | Gantz |
| 2002/0044186 | A1 | 4/2002 | Tochihara et al. |
| 2003/0030666 | A1 | 2/2003 | Najmi |
| 2003/0058082 | A1 | 3/2003 | Mallick |
| 2004/0024789 | A1 | 2/2004 | Ditcharo et al. |
| 2004/0049424 | A1 | 3/2004 | Murray |
| 2004/0107110 | A1 | 6/2004 | Gottlieb et al. |
| 2005/0153707 | A1 | 7/2005 | Ledyard |
| 2006/0004590 | A1 | 1/2006 | Khoo |
| 2006/0023569 | A1 | 2/2006 | Agullo |
| 2006/0034201 | A1 | 2/2006 | Umeda et al. |
| 2006/0059023 | A1 | 3/2006 | Mashinsky |
| 2006/0155460 | A1 | 7/2006 | Raney |
| 2006/0200306 | A1 | 9/2006 | Adamcyzk |
| 2006/0224437 | A1 | 10/2006 | Gupta |
| 2006/0242154 | A1 | 10/2006 | Rawat |
| 2007/0011324 | A1* | 1/2007 | Mehr ................ H04L 51/12 709/225 |
| 2007/0150375 | A1 | 6/2007 | Yang |
| 2007/0255627 | A1 | 11/2007 | Hallowell |
| 2007/0276595 | A1 | 11/2007 | Lewinson |
| 2008/0033633 | A1 | 2/2008 | Akiyoshi |
| 2008/0055049 | A1 | 3/2008 | Weill |
| 2008/0091342 | A1 | 4/2008 | Assael |
| 2008/0195428 | A1 | 8/2008 | O'Sullivan |
| 2008/0270019 | A1 | 10/2008 | Anderson |
| 2008/0270204 | A1 | 10/2008 | Poykko |
| 2008/0277183 | A1 | 11/2008 | Huang |
| 2009/0143965 | A1 | 6/2009 | Chang et al. |
| 2009/0156241 | A1 | 6/2009 | Staffaroni |
| 2009/0176508 | A1 | 7/2009 | Lubeck et al. |
| 2009/0192851 | A1 | 7/2009 | Bishop |
| 2009/0216600 | A1 | 8/2009 | Hill |
| 2009/0248587 | A1 | 10/2009 | Van Buskirk |
| 2009/0281844 | A1 | 11/2009 | Probst |
| 2009/0313077 | A1 | 12/2009 | Wheeler, IV |
| 2010/0042549 | A1 | 2/2010 | Adamcyzk |
| 2010/0074383 | A1 | 3/2010 | Lee |
| 2010/0205017 | A1 | 8/2010 | Sichelman et al. |
| 2010/0207812 | A1 | 8/2010 | Demirdjian |
| 2010/0292914 | A1 | 11/2010 | Vepsalinen |
| 2011/0000747 | A1 | 1/2011 | Wu |
| 2011/0009098 | A1 | 1/2011 | Kong |
| 2011/0099040 | A1 | 4/2011 | Felt |
| 2011/0118981 | A1 | 5/2011 | Chamlou |
| 2011/0145089 | A1 | 6/2011 | Khunger |
| 2011/0153629 | A1 | 6/2011 | Lehmann et al. |
| 2011/0225269 | A1 | 9/2011 | Yap et al. |
| 2011/0238755 | A1 | 9/2011 | Khan |
| 2011/0301985 | A1 | 12/2011 | Camp et al. |
| 2011/0301997 | A1 | 12/2011 | Gale et al. |
| 2011/0320230 | A1 | 12/2011 | Podgurny |
| 2012/0023294 | A1 | 1/2012 | Resnick |
| 2012/0041675 | A1 | 2/2012 | Juliver |
| 2012/0059693 | A1 | 3/2012 | Colodny et al. |
| 2012/0078671 | A1 | 3/2012 | Mohebbi |
| 2012/0078672 | A1 | 3/2012 | Mohebbi |
| 2012/0131170 | A1 | 5/2012 | Spat |
| 2012/0203599 | A1 | 8/2012 | Choi |
| 2012/0232943 | A1 | 9/2012 | Myr |
| 2012/0265580 | A1 | 10/2012 | Kobayashi |
| 2012/0290950 | A1 | 11/2012 | Rapaport |
| 2012/0311584 | A1 | 12/2012 | Gruber |
| 2013/0024249 | A1 | 1/2013 | Zohar |
| 2013/0054139 | A1 | 2/2013 | Bodin |
| 2013/0054281 | A1 | 2/2013 | Thakkar |
| 2013/0073327 | A1 | 3/2013 | Edelberg |
| 2013/0090963 | A1 | 4/2013 | Sharma |
| 2013/0102333 | A1 | 4/2013 | Dam |
| 2013/0110392 | A1 | 5/2013 | Kosseifi |
| 2013/0132140 | A1 | 5/2013 | Amin |
| 2013/0144831 | A1 | 6/2013 | Atlas |
| 2013/0179205 | A1 | 7/2013 | Slinin |
| 2013/0179215 | A1 | 7/2013 | Slinin |
| 2013/0215843 | A1 | 8/2013 | Diachina |
| 2013/0295963 | A1 | 11/2013 | Sen |
| 2013/0311997 | A1 | 11/2013 | Gruber |
| 2014/0011522 | A1 | 1/2014 | Lin |
| 2014/0051465 | A1 | 2/2014 | Ruys et al. |
| 2014/0067488 | A1 | 3/2014 | James |
| 2014/0074536 | A1 | 3/2014 | Meushar |
| 2014/0082069 | A1 | 3/2014 | Varoglu et al. |
| 2014/0129135 | A1 | 5/2014 | Holden et al. |
| 2014/0129951 | A1 | 5/2014 | Amin |
| 2014/0149441 | A1 | 5/2014 | Wang |
| 2014/0156556 | A1 | 6/2014 | Lavian |
| 2014/0172727 | A1 | 6/2014 | Abhyanker |
| 2014/0378159 | A1 | 12/2014 | Dolbakian |
| 2015/0324945 | A1 | 1/2015 | Ford |
| 2015/0046080 | A1 | 2/2015 | Wesselius |
| 2015/0154810 | A1 | 6/2015 | Tew |
| 2015/0161554 | A1 | 6/2015 | Sweeney |
| 2015/0161564 | A1 | 6/2015 | Sweeney |
| 2015/0161698 | A1 | 6/2015 | Jones |
| 2015/0161752 | A1 | 6/2015 | Barreto |
| 2015/0204684 | A1 | 7/2015 | Rostamian |
| 2015/0248689 | A1 | 9/2015 | Paul |
| 2015/0262430 | A1 | 9/2015 | Farrelly |
| 2015/0279217 | A1 | 10/2015 | Chen |
| 2015/0323327 | A1 | 11/2015 | Ford |
| 2015/0323329 | A1 | 11/2015 | Ford |
| 2015/0323330 | A1 | 11/2015 | Lord |
| 2015/0323331 | A1 | 11/2015 | Ford |
| 2015/0323335 | A1 | 11/2015 | Lord |

(56) References Cited

U.S. PATENT DOCUMENTS

| | | |
|---|---|---|
| 2015/0323336 A1 | 11/2015 | Lord |
| 2015/0324334 A1 | 11/2015 | Ford |
| 2015/0324717 A1 | 11/2015 | Lord |
| 2015/0324718 A1 | 11/2015 | Lord |
| 2015/0324729 A1 | 11/2015 | Lord |
| 2015/0324734 A1 | 11/2015 | Ford |
| 2015/0325158 A1 | 11/2015 | Ford |
| 2015/0339923 A1 | 11/2015 | Konig |
| 2015/0345951 A1 | 12/2015 | Dutta |
| 2015/0356803 A1 | 12/2015 | Ellis |
| 2016/0019728 A1 | 1/2016 | Petrie |
| 2016/0026935 A1 | 1/2016 | Botea |
| 2016/0026936 A1 | 1/2016 | Richardson |
| 2016/0027306 A1 | 1/2016 | Lambert |
| 2016/0034828 A1 | 2/2016 | Sarawgi |
| 2016/0034845 A1 | 2/2016 | Hayama |
| 2016/0117610 A1 | 4/2016 | Ikeda |
| 2016/0132792 A1 | 5/2016 | Rosnow |
| 2016/0138928 A1 | 5/2016 | Guo |
| 2016/0180346 A1 | 6/2016 | Cheng |
| 2016/0300318 A1 | 10/2016 | Godil |
| 2016/0334232 A1 | 11/2016 | Zhuang |
| 2016/0364678 A1 | 12/2016 | Cao |
| 2016/0364679 A1 | 12/2016 | Cao |
| 2016/0364812 A1 | 12/2016 | Cao |
| 2016/0364823 A1 | 12/2016 | Cao |
| 2016/0364824 A1 | 12/2016 | Bryant |
| 2017/0011324 A1 | 1/2017 | Truong |
| 2017/0083832 A1 | 3/2017 | Williams |
| 2017/0126837 A1 | 5/2017 | Wang |
| 2017/0132540 A1* | 5/2017 | Haparnas ........... G06Q 10/1093 |
| 2017/0138749 A1 | 5/2017 | Pan |
| 2017/0147951 A1 | 5/2017 | Meyer |
| 2017/0186126 A1 | 6/2017 | Marco |
| 2017/0193404 A1 | 7/2017 | Yoo |
| 2017/0220966 A1 | 8/2017 | Wang |
| 2017/0300848 A1 | 10/2017 | Shoval |
| 2017/0308824 A1 | 10/2017 | Lord |
| 2018/0003843 A1 | 1/2018 | Hori et al. |
| 2018/0005145 A1 | 1/2018 | Lo |
| 2018/0071634 A1* | 3/2018 | Carvallo ............... A63F 13/335 |
| 2018/0081496 A1* | 3/2018 | Bhardwaj ............... G06F 3/167 |
| 2018/0091603 A1 | 3/2018 | Nickels |
| 2018/0091604 A1 | 3/2018 | Yamashita |
| 2018/0101925 A1 | 4/2018 | Brinig |
| 2018/0102017 A1 | 4/2018 | Brinig |
| 2018/0180426 A1 | 6/2018 | Pan |
| 2018/0211351 A1 | 7/2018 | Kim |
| 2018/0268329 A1 | 9/2018 | Lord |
| 2018/0293521 A1 | 10/2018 | Akselrod |
| 2018/0339714 A1 | 11/2018 | Smid |
| 2018/0356239 A1 | 12/2018 | Marco |
| 2019/0035202 A1 | 1/2019 | Brinig |
| 2019/0052728 A1* | 2/2019 | Cheng ................... H04L 67/535 |
| 2019/0095849 A1 | 3/2019 | Sweeney |
| 2019/0109910 A1* | 4/2019 | Sweeney ............... H04W 48/18 |
| 2019/0205812 A1 | 7/2019 | Afzal |
| 2019/0206009 A1* | 7/2019 | Gibson ................. G06N 7/005 |
| 2019/0221069 A1 | 7/2019 | Brinig |
| 2019/0244318 A1 | 8/2019 | Rajcok |
| 2019/0265703 A1 | 8/2019 | Hicok |
| 2019/0311629 A1 | 10/2019 | Sierra |
| 2020/0013020 A1 | 1/2020 | Yang |
| 2020/0145503 A1 | 5/2020 | Sweeney |
| 2020/0173979 A1 | 6/2020 | Nickels |
| 2020/0211070 A1 | 7/2020 | Singh |
| 2020/0258344 A1 | 8/2020 | Brinig |
| 2020/0272965 A1 | 8/2020 | Tanabe |
| 2020/0322451 A1 | 10/2020 | Cheng |
| 2020/0334987 A1 | 10/2020 | Shoval |
| 2021/0223051 A1 | 7/2021 | Hochberg |
| 2021/0248520 A1 | 8/2021 | Krishnamurthy |
| 2021/0256437 A1 | 8/2021 | Stayner |
| 2021/0256794 A1 | 8/2021 | Brinig |
| 2021/0312338 A1 | 10/2021 | Stayner |
| 2021/0337047 A1 | 10/2021 | Cheng |
| 2021/0364302 A1 | 11/2021 | Nickels |
| 2022/0006870 A1 | 1/2022 | Sweeney |

FOREIGN PATENT DOCUMENTS

| | | |
|---|---|---|
| DE | 10201607712 | 11/2016 |
| JP | 2002-133592 | 5/2002 |
| JP | 2004-302941 | 10/2004 |
| JP | 2004-362271 | 12/2004 |
| JP | 2005-107942 | 4/2005 |
| JP | 2006-339810 | 12/2006 |
| JP | 3934985 | 6/2007 |
| JP | 2014-130552 | 6/2014 |
| JP | 2014-238831 | 12/2014 |
| JP | 2004-073639 | 5/2015 |
| KR | 10-2010-0053717 | 5/2010 |
| KR | 10-2014-0124137 | 10/2014 |
| KR | 10-2015-0045962 | 4/2015 |
| WO | WO 1999/044186 | 2/1999 |
| WO | WO 1999044186 | 9/1999 |
| WO | WO 2005/013588 | 2/2005 |
| WO | WO 2011067741 | 6/2011 |
| WO | WO 2011069170 | 6/2011 |
| WO | WO 2014106617 | 7/2014 |

OTHER PUBLICATIONS

Office Action in JP 2018-524399 dated Apr. 8, 2020.
Office Action in BR 1120170017768 dated May 6, 2020.
Exam Report No. 2 in AU 2014362378 dated May 7, 2020.
Hai Yang et al. "Equilibria of bilateral taxi-customer searching and meeting on networks", Transportation Research Part B., 2010, vol. 44, pp. 1067-1083.
International Search Report in PCT/US2015/034831 dated Sep. 24, 2015.
International Search Report in PCT/US2015/043654 dated Nov. 26, 2015.
International Search report in PCT/US2016/016858 dated May 19, 2016.
IPRP in PCT/US2014/069602 dated Jun. 23, 2016.
Alfred Round, et al.: Future Ride: Adapting New Technologies to Paratransit in the United States, UC Transportation Center Berkeley, CA, UCTC No. 306 (1996).
Kikuchi, et al., "Advanced Traveler Aid Systems for Public Transportation", US Department of Transportation, Sep. 1994.
Fu, et al., "On-Line and Off-Line Routing and Scheduling of Dial-a-Ride Paratransit Vehicles", Computer-Aided Civil and Infrastructure Engineering 14 (1999).
International Search Report and Written Opinion issued in PCT/US2016/062344 dated Jan. 31, 2017.
Extended Search Report issued in EP 14869805.3 dated May 10, 2017.
Extended Search Report issued in EP 15826507.1 dated Nov. 10, 2017.
International Search Report in PCT/US2017/053065 dated Sep. 22, 2017.
Written Opinion issued in SG 11201700669R dated Dec. 5, 2017.
Robert Kuhlthau and Ira D. Jacobson, The Development of a Model for Predicting Passenger Acceptance of Short Haul Air Transportation Systems, NASA, Sep. 1977.
Xing Wang, Optimizing Ride Matches for Dynamic Ride Sharing Systems, GIT, May 2013.
International Search Report issued in PCT/US2017/053065 dated Dec. 13, 2017.
First Examination Report in EP 14869806.3 dated May 4, 2018.
Aloizio P. Silva, A Mobile Location-Based Vehicle Fleet Management Service Application, 0-7803-78482/03 2003, IEEE.
Andersson, Magnus, Peer-to-Peer Service Sharing Platforms: Driving Share and Share Alike on a Mass-Scale, Thirty Fourth International Conference on Information Systems, Milan 2013, pp. 1-15 (2013).
First Office Action in CN 2014800731753 dated Feb. 3, 2019.
Examination Reported in AU 2017342747 dated Apr. 8, 2019.

(56) References Cited

OTHER PUBLICATIONS

Office Action in EP 15826501.7 dated May 14, 2019.
EESR in EP 17859424.8 dated Aug. 5, 2019.
ISR and Written Opinion in PCT/US2018/055256 dated Jan. 30, 2019.
How to request multiple Uber vehicles, Aug. 15, 2013 (https://www.wikihow.com/ Request-Multiple-Uber-Vehicles.
How to book two cabs at the same time in Uber, Jun. 30, 2017 (https://fastandclean.org/ book-two-cabs-time-uber).
Is it possible to order 2 Ubers at the same time, Jul. 13, 2015 (https://web.archive.org/web/20150801000000*/https://android.Stackexchange.com/questions/114027/is-it- possible-to-order-2-ubers-at-the-same-time.
Written Opinion in PCT/US2018/055256 dated Jul. 19, 2019.
Examination Report No. 1 in AU 2014362392 dated Sep. 10, 2019.
Examination Report No. 1 in AU 2014362378 dated Sep. 18, 2019.
Exam Report No. 2 in AU 2017/342747 dated Aug. 27, 2019.
Second Office Action dated Sep. 27, 2019 in CN 2014800731753.
Office Action dated Apr. 16, 2020 in EP 1670690.0.
Exam Report No. 2 in AU 2015296265 dated Aug. 13, 2020.
Office Action in BR 1120180097799 dated Aug. 27, 2020.
Office Action in CA 2,932,828 dated Feb. 8, 2021.
Office Action in BR 1220200245654 dated Feb. 4, 2021.
Office Action in CA 2,956,631 dated May 7, 2021.
ISR and Written Opinion in PCT/US2021/013677 dated Jun. 16, 2021.

* cited by examiner

FORECASTING REQUESTS BASED ON CONTEXT DATA FOR A NETWORK-BASED SERVICE

BACKGROUND

A network-based service can enable users to request and receive various services through applications on mobile computing devices. The network-based service can match a service provider with a requesting user based on the current location of the service provider and a start location specified by the requesting user or determined based on the current location of the requesting user.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
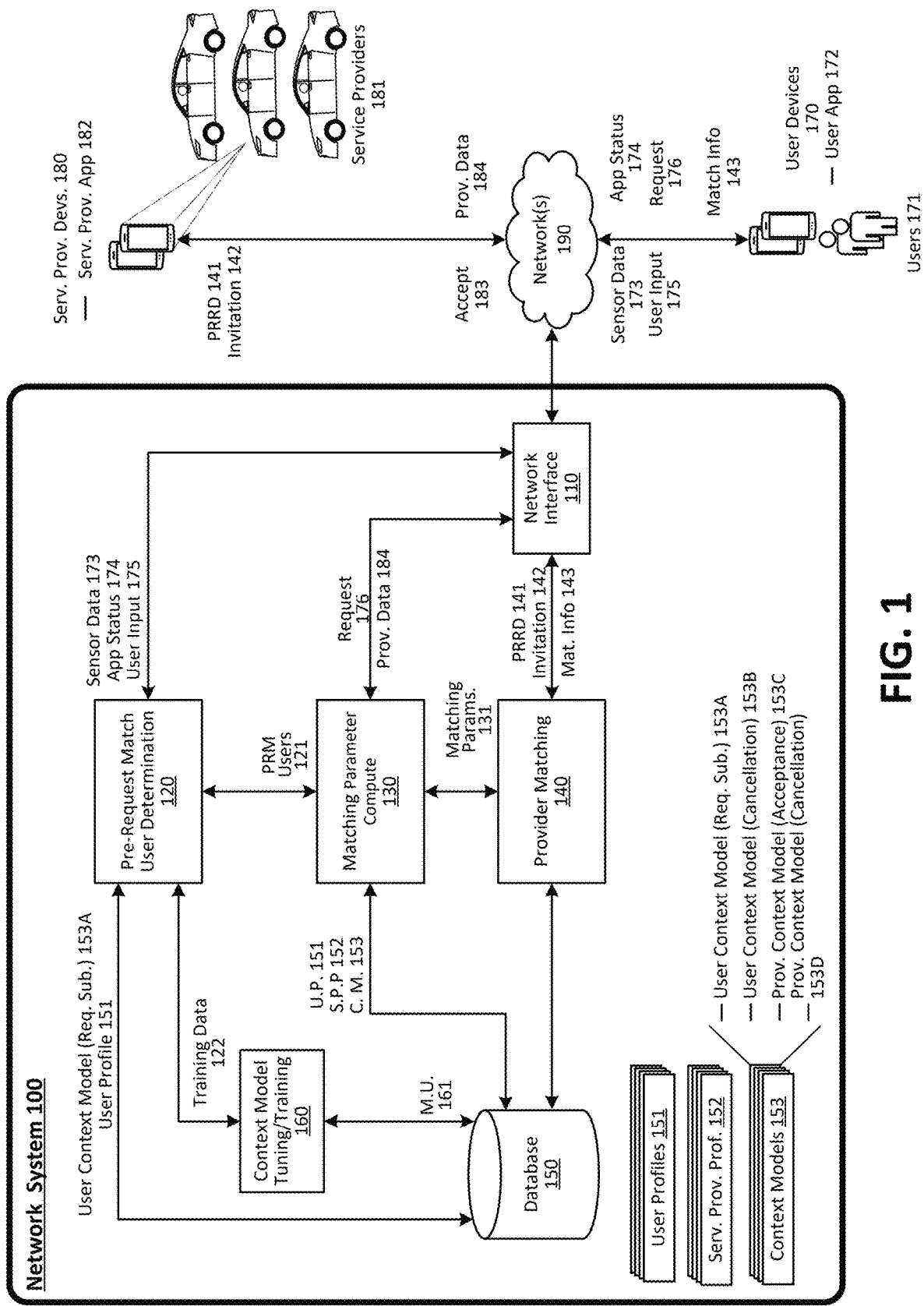
FIG. 1 is a block diagram illustrating an example network system in communication with user devices and provider devices, in accordance with examples described herein.

A network system is provided herein that manages an on-demand network-based service linking available service providers with service requesters throughout a given region (e.g., a metroplex such as the San Francisco Bay Area). In doing so, the network system can receive service requests for on-demand services (e.g., transport service or delivery service) from requesting users (e.g., a rider) via a designated service requester application executing on the users' mobile computing devices. Based on a service location, the network system can identify a number of proximate available service providers (e.g., a driver) and transmit a service invitation to one or more service provider devices of the proximate available service providers to fulfil the service request. In many examples, the service providers can either accept or decline the invitation based on, for example, the service location being impractical for the service provider.

In selecting a service provider to fulfill a given service request, the network system can identify a service provider based, at least in part, on a start location indicated in the service request. For example, the network system can determine a geo-fence surrounding the start location (or a geo-fence defined by a radius away from the start location), identify a set of candidate service providers (e.g., twenty or thirty service providers within the geo-fence), and select an optimal service provider (e.g., closest service provider to the service location, service provider with the shortest estimated travel time from the service location, service provider traveling to a location within a specified distance or specified travel time to the destination location, etc.) from the candidate service providers to fulfill the service request. According to examples provided herein, the network system can compile historical data for individual service requesters with regard to the network-based service. Thus, the network system can manage a service requester profile for each service requester indicating routine start and/or end locations (or regions), and/or routine routes (e.g., for a transportation service from home to work and/or vice versa) and preferred service types (e.g., transportation, delivery, mailing, etc.). In some examples, the network system can further synchronize with a service requester device to, for example, identify the service requester's contacts, the service requester's schedule and appointments, travel plans (e.g., a scheduled trip), and the like.

According to embodiments, the network system is configured to identify service providers for users who have not yet submitted service requests using their respective user devices. This process can be referred to herein as pre-request matching and the users for whom this process is performed can be referred to herein as pre-request matching users. A service provider who is pre-request matched with a user can be held for the user (e.g., classified or labeled by the network system as unavailable for matching with other users) for at least a period of time (e.g., until the user submits a service request or until the pre-request match expires). In some examples, during this period of time in which the service provider is pre-matched with the user, the network system can be configured to hold the service provider without transmitting an invitation associated with the pre-request matched user to the service provider.

In some implementations, the network system can transmit a pre-request relocation direction to the pre-request matched service provider. The pre-request relocation direction can direct the service provider to or towards a location (e.g., start location specified by the user, current location of the user, a general pickup area for service providers, etc.) in anticipation of the pre-matched user submitting a service request.

In various implementations, the network system can determine whether to perform pre-request matching for a user. This determination can be made based on, for example, context data relating to the user. The context data relating to the user can be transmitted periodically or continuously from the user device to the network system as the user interacts with the user application. The context data can include user application status data, user application interaction data, user device sensor data, and/or user profile data.

In an example, a context model (e.g., a user request submission context model) can be trained based on historical data of the network system and can be used to determine, based on the context data relating to the user, whether to perform pre-request matching for the user. For instance, the network system can determine a likelihood of whether the user will submit a service request within a given time window based on the context data relating to the user in determining whether to perform pre-request matching for the user.

In addition or as an alternative, the identification of pre-request matching users within a geographic region managed by the network system can be based dynamic conditions of the network-based service within the geographic region. For instance, if the number of pending service requests associated with the region (e.g., service requests having a start location within the region) exceeds the number of available service providers in the region, the network system can determine to not identify any pre-request matching users for a subsequent provider matching process and consequently not perform pre-request matching. Similarly, if the ratio of available service providers to pending service requests falls below a threshold value, the network system can determine to not identify any pre-request matching users, or alternatively, identify fewer pre-request matching users (e.g., by adjusting threshold values used in the process to identify pre-request matching users). The network system can further continuously monitor metrics that are representative of the conditions of the network-based service including, for example a measure of wait times for users in the region (e.g., average or median wait times for users to rendezvous with service providers). The identification of pre-request matching users (or whether pre-request matching is performed) can be based at least in part on these metrics for the region. Similarly, it can be based further on a system load (e.g., a computation load for the network system in managing the network-based service in the region or across different regions) or an anticipated system load.

Among other benefits, the network system, by dynamically determining to perform pre-request matching based on context data, can achieve efficient use of computing resources to perform pre-request matching. For instance, pre-request matching can be performed for all active users (e.g., all users interacting with user applications on their respective devices) so that system response times in matching service providers with users can be reduced across the board. However, this brute force implementation can require a huge amount of computing resources in computing matching parameters and performing pre-request matching to identify potential service providers for all active users, especially for systems managing the network-based service for large metropolitan areas such as San Francisco and New York City. In embodiments described herein, by training one or more context models and using context data associated with users to selectively perform pre-request matching for a subset of active users (e.g., users who are determined by the context models using the context data to be most likely to imminently submit service requests), the network system can achieve the benefits of reducing system response times (e.g., in matching users with service providers) without taking on such large workloads. Furthermore, this implementation also reduces wasted computing resources. By performing pre-request matching based on context data and/or a propensity of the users to submit service requests within a given time window, the network system can pre-emptively identify service providers for users who are likely to submit service requests but not for those who are determined to be unlikely to do so. In this manner, wasted computing resources in identifying service providers for users who end up not submitting service requests are minimized. Similarly, brute force pre-request matching for all active users can be inefficient in that service providers can be matched with users who are active but not likely to imminently submit a service request. Such service providers would therefore be classified as unavailable by the network system to match with other users, who either have already submitted service requests or who are actually likely to submit service requests. By performing pre-request matching based on context data, the network system can avoid tying up service providers to active users who are unlikely to imminently submit service requests. Additionally, by identifying pre-request matching users (or determining whether to perform pre-request matching) based on dynamic conditions of the network-based service within the geographic region and/or the system load, the network system maintains flexibility over other implementations to prioritize computing resources (e.g., by not performing pre-request matching when system load is high).

In the examples described herein, the network system can compute matching parameters for a set of users (e.g., post-request matching users and/or pre-request matching users) and a set of available service providers in the region. Provider matching can be performed based on the computed matching parameters. In some implementations, the network system computes matching parameters for each potential (or hypothetical) user-to-provider pairing of the set of users and the set of available service providers. The potential user-to-provider pairings can be limited (e.g., based on the service request, anticipated service request information (for pre-request matching), user profile and/or service provider information, and the like) and may not include every possible user-to-provider pairing from the set of users and the set of service providers. For example, the network system can ignore (e.g., do not compute matching parameters for) a potential user-to-provider pairing of a first user and a first service provider based on the first user having submitted service request for specific service class (e.g., a luxury transport service) and the first service provider being associated with a different service class (e.g., an economy transport service, a rideshare transport service, etc.).

According to embodiments, the network system can identify a service provider for a given user by optimizing matching parameters (e.g., by performing multivariate optimizations). The matching parameters can include location-based parameters such as a distance between the service provider and the given user, an estimated time of arrival of the service provider to rendezvous with the given user, an estimated time of arrival of the given user at a service location (e.g., destination location of a transport service), an estimated cost for the requested service, etc. In certain implementations, the matching parameters can further include context-based parameters such as a determined likelihood of the user canceling the service request, a determined propensity of the service provider accepting an invitation related to the service request, a determined likelihood of the service provider cancelling an accepted invitation, and/or a determined propensity of the user submitting a service request (for pre-request matching). The context-based parameters can be determined using one or more context models based on context data associated with the user or the service provider.

In some examples, the network system can optimize the matching parameters on a group basis to identify optimal user-to-provider pairings from the potential user-to-provider pairings. The network system can perform group multivariate optimizations of the parameters or variables described herein, such as distances of the service providers to the users, estimated times of arrival of the service providers, etc. In terms of implementation, the network system can utilize a number of different technological approaches in performing the group multivariate optimizations, including performing Markov chain Monte Carlo optimizations, using heuristic algorithms, resolving bipartite graphs, and the like. In certain examples, when the network system identifies or classifies a user as a pre-request matching user, the network system can include the user as part of the group when performing group multivariate optimizations.

In some examples, the network system can perform provider matching periodically (e.g., in accordance with a fixed schedule such as every thirty seconds or every two minutes, etc.). For instance, computation of matching parameters can be performed during pre-match computation time periods and the provider matching based on the computed matching parameters can be performed during provider matching time periods. Each provider matching time periods can be preceded by an associated pre-match computation time period. A service request received too late to be included in the set of users for an upcoming provider matching period can be matched with service providers during a subsequent provider matching period. As an alternative implementation, the network system can perform provider matching in a dynamic fashion and not in accordance with any fixed schedule or cycle. For instance, the network system can perform provider matching as soon as a critical or threshold number of service requests have been received (and/or pre-request matching users have been determined). As a further alternative, the network system can alternate between performing provider matching periodically in accordance with a fixed schedule or cycle and performing provider matching dynamically. For instance, during periods of low demand or low expected demand for the network-based service, the network system can determine to perform provider matching dynamically.

In comparison to existing systems that perform provider matching based only on location-based matching parameters, the network system, by performing provider matching based at least in part on context-based parameters, can perform provider matching in a manner that takes into account a propensity of users to cancel the service request or the service provider to cancel the acceptance of an invitation after the matching is determined and the relevant service information is relayed to the user and the service provider. In this manner, the network system can prioritize user-to-provider pairings that are less likely to result in cancellations in performing provider matching. As a result, cancellations on the part of users as well as service providers can be minimized and less computation resources are wasted as a result of such cancellations.

As referred to herein, context models can be machine-learned models trained using historical data of the network-based service. The context models can be generated or trained using historical data associated with the network-based service and can link context data with a propensity or likelihood of a specific user or service provider action. As an example, the user request submission context model can link context data to a propensity or likelihood of users to submit service requests within a given period of time. As another example, a user cancellation context model can link context data to a propensity or likelihood of users to cancel a service request. Furthermore, service provider acceptance and service provider cancellation context models can link context data to a propensity or likelihood of service providers accepting an invitation and cancelling an accepted invitation, respectively. In the examples described herein, the network system can compute a probability of the user (or service provider) action in question by providing the specific context data associated with the user (or service provider) as inputs to the appropriate context models. Alternatively, the context models can generate a decision output corresponding to an action to be taken by the network system based on the context data (e.g., a binary output indicating whether an action should be taken for a given user or service provider).

According to embodiments, the user request submission context model(s) can link context data such as user application interaction data, user application status, and/or user device sensor data with a propensity (based on historical or past behavior of a population of users of the network-based service, or based on the past actions of the user) of the user to submit a service request. In another example, the user's progress in going through a user interface flow in submitting the service request within the user application can be used to determine a propensity of the user to submit a service request. In another example, the user's input or interaction with the user application (e.g., inputting a start location, selecting a service class, inputting a service location, etc.) can be used. In yet more examples, user sensor data indicating the user's elevation (or a difference between the user's elevation and the elevation of the street at the user's start location) and/or the user's location (or a distance between the user's current location and the user's start location) can be used to determine a propensity of the user to submit a service request. In some examples, the network system can analyze historical data of the network-based service to identify a number of factors that may be correlated with users' propensity to submit service requests. Each of the factors can be identified as potential context data for use in the user request submission context model.

In various aspects, one or more context models can also be used by the network system to compute matching parameters used in determining optimal user-to-provider pairings. For a potential user-to-provider pairing of a user and a service provider, context-based matching parameters can include a propensity of the user to cancel a service request after being matched with the service provider. Such a matching parameter can be determined using the user cancellation context model. In one example, a difference between a first estimated time of arrival (e.g., an initial estimated time of arrival of service providers presented within the user application prior to the matching parameters of the user being computed or when the user application is first initialized) and the estimated time of arrival of the service provider can be used to determine a propensity of the user cancelling the service request should the service provider be identified to fulfill the service request for the user. Thus, in this manner, whether a service provider is identified for a user can depend on the difference between the initial estimated wait time provided by the network system to the user and an estimated wait time of the user for the service provider (e.g., determined based on the service provider's current location and the start location).

As used herein, the terms "optimize," "optimization," "optimizing," and the like are not intended to be restricted or limited to processes that achieve the most optimal outcomes. Rather, these terms encompass technological processes (e.g., heuristics, stochastics modeling, machine learning, reinforced learning, Monte Carlo methods, Markov decision processes, etc.) that aim to achieve desirable results. Similarly, terms such as "minimize" and "maximize"

are not intended to be restricted or limited to processes or results that achieve the absolute minimum or absolute maximum possible values of a metric, parameter, or variable.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Descriptions

FIG. 1 is a block diagram illustrating an example network system configured to perform pre-request matching based on context information, in accordance with examples described herein. The network system 100 can implement and manage a network service that connects requesting users 171 with service providers 184 that are available to service the users' requests for service 171. The network service can provide a platform that facilitates services to be requested and provided between requesting users 171 and available service providers 181 by way of a user application 172 executing on the user devices 170 and a service provider application 182 executing on the service provider devices 180. As used herein, a user device 170 and a service provider device 180 can correspond to a computing device with functionality to execute a designated application (e.g., a user application, a provider application, etc.) associated with the network service managed by the network system 100. According to embodiments, the user device 170 and the service provider device 180 can correspond to mobile computing devices, such as smartphones, tablet computers, VR or AR headsets, on-board computing systems of vehicles, smart watches, and the like.

The network system 100 can include a network interface 110 to communicate with user devices 170 and service provider devices 180 over one or more networks 190 via the designated applications (e.g., user application 172, service provider application 182, etc.) executing on the devices. According to examples, a requesting user 171 wishing to utilize the network service can launch the user application 172 and transmit a request for service (e.g., request 176) over network 190 to the network system 100. In certain implementations, the requesting user 171 can view multiple different service types managed by the network system 100, such as ride-pooling, a basic or economy service type, a luxury vehicle service type, a van or large vehicle service type, a professional service provider service (e.g., in which the service providers are certified), a self-driving vehicle service, a rickshaw service, and the like. The network system 100 can utilize the service provider locations to provide the user devices 170 with ETA data of proximate service providers for each respective service. For example, the user application 172 can enable the user 171 to scroll through each service type. In response to a soft selection of a particular service type, the network system 100 can provide ETA data on a user interface of the user application 172 that indicates an ETA for the service type and/or the locations of all proximate available vehicles for that service type. As the user scrolls through each service type, the user interface can update to show visual representations of vehicles for that service type on a map centered around the user 171 or a start location set by the user. The user can interact with the user interface of the user application 172 to select a particular service type, and transmit a request 176.

As users 171 interact with user applications 172, the user devices 170 can transmit context data to the network system 100 via the network 190. Context data received from the user devices 170 such as sensor data 173 (e.g., geolocation data, barometer data, accelerometer data, e-compass data, gyroscope data, ambient light sensor data, wireless connectivity data, etc.), application status 174 (e.g., a launched status, a foreground execution status, a background execution status, etc.), and user input 175 (e.g., user inputs to the user application 172). The user devices 170 can be configured to periodically transmit context data to the network system 100. In addition or as an alternative, the user device 170 can be configured to transmit context data in real-time to the network system 100 in response to events detected on the user device 170 (e.g., in response to detecting a change in sensor data reading, in response to user input received via the user application, in response to detecting a change in the user application status, etc.).

According to embodiments, the network system 100 is configured to perform pre-request matching for users 171. In other words, the network system 100 is configured to match a given user with a service provider prior to the user submitting a service request. The network system 100 can selectively perform pre-request matching for a subset of the users 171 based on determined likelihoods of the users 171 submitting service requests 176 prior to the users 171 actually doing so via the user application 172. The network system 100 can perform pre-request matching for only the subset of users 171 who are determined by the network system 100 as likely to submit service requests.

According to embodiments, the network system 100 includes a pre-request match user determination (PRMUD) 120 to determine a subset (if any) of the users 171 for whom the network system 100 is to perform pre-request matching (pre-request matching users 121 or PRM users 121). The pre-request match user determination 120 can make this determination using context models 155 retrieved from a set of context models 153 stored within a database 150 that is maintained by the network system 100. The context models 153 maintained within the database 150 can include user request submission context model 153A, user cancellation context model 153B, provider acceptance context model 153C, and provider cancellation context model 153D. For the purposes of determining whether to perform pre-request matching, the user request submission context model 153A can be used. The other context models are used to determine other contextual information and/or likelihoods that are used in other portions of the matching process.

In various examples, the user request submission context model 153A can be determined based on context data received from the user devices. For instance, context data such as sensor data 173, user application status 174, and user input 175 used as inputs to the user request submission context model 153A. In some implementations, the user request submission context model 153A can determine, based on context data relating to a given user, a likelihood that the given user will submit a service request. If the likelihood is above a threshold value, the given user is included in the subset of the PRM users 121 for which pre-request matching will be performed by the network system. In other implementations, the user request submission context model 153A can simply determine a binary output (e.g., yes or no) as to whether to include the given user in the PRM users 121 based on the context data relating to the given user.

In various examples, sensor data 173 can include geolocation data (e.g., GPS, GLONASS, BeiDou, Galileo, etc.) generated by the user device 170. The sensor data 173 can further include accelerometer data, barometer data, gyroscope data, ambient light sensor data, e-compass data, wireless connectivity data, and the like.

According to embodiments, user application status 174 for a given user can indicate a status of the user application 172 executing the given user's user device 170. For instance, user application status 174 can be transmitted to the network system 100 to indicate that the given user has launched the user application 172 on the user device 170 of the given user. Furthermore, the user application status 174 can also indicate whether the user application 172 is executing as a foreground application or as a background application on the user device 170 of the given user. The user application status 174 can further indicate an amount of time the user application 172 has been executing as a foreground process or an amount of time the user application has been executing as a background process on the user device 170 of the given user. Additionally, user application status 174 can indicate whether and/or when the given user has terminated the user application 172.

In various implementations, user input 175 for a given user can include user interactions with the user application 172 executing on the user device 170 of the given user. User interactions can include touch input, touch gestures, user activation of specific user interface features within the user application, text input, and the like. For example, the user input 175 can indicate a start location input, a service class, and/or a service location input by the given user via the service application. In addition or as an alternative, the user input 175 can further indicate a degree of progress the given user has made towards submitting a service request (e.g., as a percentage of completion in the number of steps or interactions needed to submit a service request). For example, the user input 175 can indicate that the user has completed two out of five steps (e.g., entering a start location/confirming a determined start location, confirming a service class, entering a service location, viewing a summary screen, and pressing a "Request" soft feature) in completing the user interface flow in submitting a service request.

Exemplary ways of how sensor data 173, application status 174, and user input 175 can be modeled and used by the pre-request match user determination 120 and the network system 100 to determine a likelihood of a given user submitting a service request are provided below. In the discussions herein, functional language is used to describe these examples for simplicity and the use of such language is not meant in any way to limit the implementation of the context models 153 or pre-request match user determination 120.

As one example with respect to how pre-request match user determination 120 can use sensor data 173 to determine whether to perform pre-request matching for a given user, the sensor data 173 can include barometer data or elevation data. For instance, the pre-request match user determination 120 can determine an elevation or altitude of the given user based on the barometer data. Alternatively, the user device of the given user can determine the elevation of the given user and transmit elevation data to the network system 100 as sensor data 173. The user request submission context model 153A can take into account the elevation of the given user in determining whether to perform pre-request matching for the given user. For instance, a comparison the elevation of the given user with the known elevation of the start location (e.g., elevation of the street level based on map data) can be used. A determination that the given user is at the street level based on the elevation data can indicate that the given user is more likely to imminently submit a service request than if the given user was determined, based on the elevation data, to be located on a high floor of a high-rise building.

As another example, sensor data 173 can include location data generated by the user device of the given user. The user request submission context model 153A can take into account a comparison of the current location of the given user (as determined by the location data) with the start location to determine to perform pre-request matching for the given user. For instance, based on the current location of the given user, the network system 100 can determine that the given user is at an airport. In response, the network system 100 can automatically determine the start location for the given user to be a designated pickup location at the airport without the given user entering or confirming the start location within the user application 172. A determination that the given user is close to the start location (e.g., the designated pickup location at the airport) can indicate that the given user is more likely to imminently submit a service request as compared to a determination that the given user is far from the start location.

In yet another example, sensor data 173 can include ambient light sensor data which can indicate an ambient light level of the surrounding of the given user. A determination can be made as to whether the given user is at or near the start location based on the ambient light sensor data. For instance, the user request submission context model 153A can take into account a determination that the given user is an indoor environment as indicated by the ambient light sensor data whereas the start location is an outdoor location, which can indicate that the given user is less likely than otherwise to imminently submit a service request.

As an example with respect to how pre-request match user determination 120 can use application status 174 to determine whether to perform pre-request matching for a given user, the application status 174 can indicate a status of execution of the user application 172 (e.g., whether the user application 172 is executing on the user device of the given user as a foreground process or as a background process). An indication that the user application 172 is executing as a background process can be used by the user context model 153 a is an indicator that the given user is less likely to submit a service request.

The application status 174 can further indicate a length of time for which the user application 172 has been executing as a background process or as a foreground process. The user context model 153 a can similarly use the length of time that the user application 172 has been executing as a background process in determining whether to perform pre-request matching for the given user (e.g., a long period of time of the user application 172 executing as a background application can be used as an indicator that the given user is no longer interested in submitting a service request via the user application 172). In addition or as an alternative, the application status 174 can indicate whether the given user has terminated the user application 172 on the user device (e.g., an indication of the user application 172 being terminated on the user device 171 can be used as an indicator that the given user is less likely to imminently submit a service request).

As an example with respect to how pre-request match user determination 120 can use the user input 175 to determine whether to perform pre-request matching for a given user, the application status 174 can indicate a degree of progress the given user has made towards submitting a service request (e.g., as a percentage of completion in the number of steps or interactions needed to submit a service request). For instance, a further degree of progress through the user interface flow in submitting a service request can be used as an indicator that the given user is more likely than otherwise to submit a service request. Furthermore, similar to what has been described above, a user input 175 of a start location that is in close proximity of the given user's current location can be an indicator that the given user is more likely to submit a service request than a user input 175 indicating a start location that is far from the given user's current location.

In various examples, the pre-request match user determination 120 can further determine whether the network system should perform pre-request matching for a given user of the users 171 based on a user profile 151 of the given user.

In the examples described herein, the network system 100 includes a matching parameter compute 130 to compute matching parameters. In doing so, the matching parameter compute 130 can determine a set of available service providers based on the provider data 184 received from the provider devices 181. On the other hand, the set of users for whom the network system 100 is to perform provider matching and for whom the matching parameter compute 130 is to compute matching parameters can include users 171 in the region who submitted service requests and the pre-request matching users 121 determined by the pre-request match user determination 120.

According to one implementation, the network system 100 further includes provider matching 140 to match users with service providers based on the matching parameters 131 computed by the matching parameter compute 130. The provider matching 140 can select an optimal user-to-provider pairings from the potential (or hypothetical) user-to-provider pairings based on a group optimization of the matching parameters 131. In one implementation, the provider matching 140 can resolve a bipartite graph to select the optimal user-to-provider pairings. For instance, the matching parameter compute 130 can compute matching parameters associated with each of the potential user-to-provider pairings of the set of users and the set of service providers. The matching parameter compute 130 can set up a bipartite graph data structure G=(U, P, E), where U represents vertices of the bipartite graph that correspond to the set of users, P represents vertices of the bipartite graph that correspond to the set of providers, and E represents the edges between vertices U and P that correspond to potential user-to-provider pairings. For each edge, the corresponding value associated therewith can be based on the matching parameters computed for the corresponding potential user-to-provider pairing. For instance, a first edge E1 between a first user U1 and a first provider P1 can represent the potential user-to-provide pairing between U1 and P1. The value associated with E1 can be based on the matching parameters computed for the potential user-to-provider pairing between U1 and P1. For instance, the value associated with E1 can be a weighted sum of the matching parameters (e.g., location-based parameters, context-based parameters, etc.) computed for U1 and P1. The provider matching 140 can resolve the bipartite graph by selecting edges from the set of edges E that optimize an aggregate measure (e.g., sum, mean, average) of values of the selected edges. According to examples, the provider matching 140 can select edges such that each of the vertices of U has one edge selected (if possible), thereby ensuring that each of the set of users has a corresponding matched service provider. The provider matching 140 can also do so such that the no vertex within P is coupled to more than one vertex within U (and vice versa), thereby ensuring that no service provider is simultaneously matched with two users (and vice versa). The set of selected edges, which is a subset of the edges E in the bipartite graph, can represent the selected user-to-provider pairings.

In various implementations, the network system 100 can transmit relevant information to the matched service providers and users. For instance, the network system 100 can transmit pre-request relocation directions 141 to provider devices of service providers who are pre-request matched with users. Similarly, the network system 100 can transmit invitations 142 to provider devices of service providers who are post-request matched with users.

The network system 100 can further receive acceptances 183 from provider devices of service providers who accept their respective invitations 142. In response to receiving an acceptance 183 from a provider device, the network system 100 can proceed with facilitating the provision of the requested service by the service provider. For example, the network system 100 can transmit match information 143 to the user device 170 of the requesting user 171 to enable the user device 170 to display information regarding the matched service provider (e.g., name, picture, service provider rating, vehicle identification information, etc.). The user device 170 can further display user interface features to contact the service provider (e.g., via a telephony service, via text messaging/chat) using the user application 172 executing on the user device 170. In addition, the network system 100 can transmit service information to the provider device to enable the provider device to, for example, present navigation directions to the start location of the requesting user.

Methodology

Figure 2A:
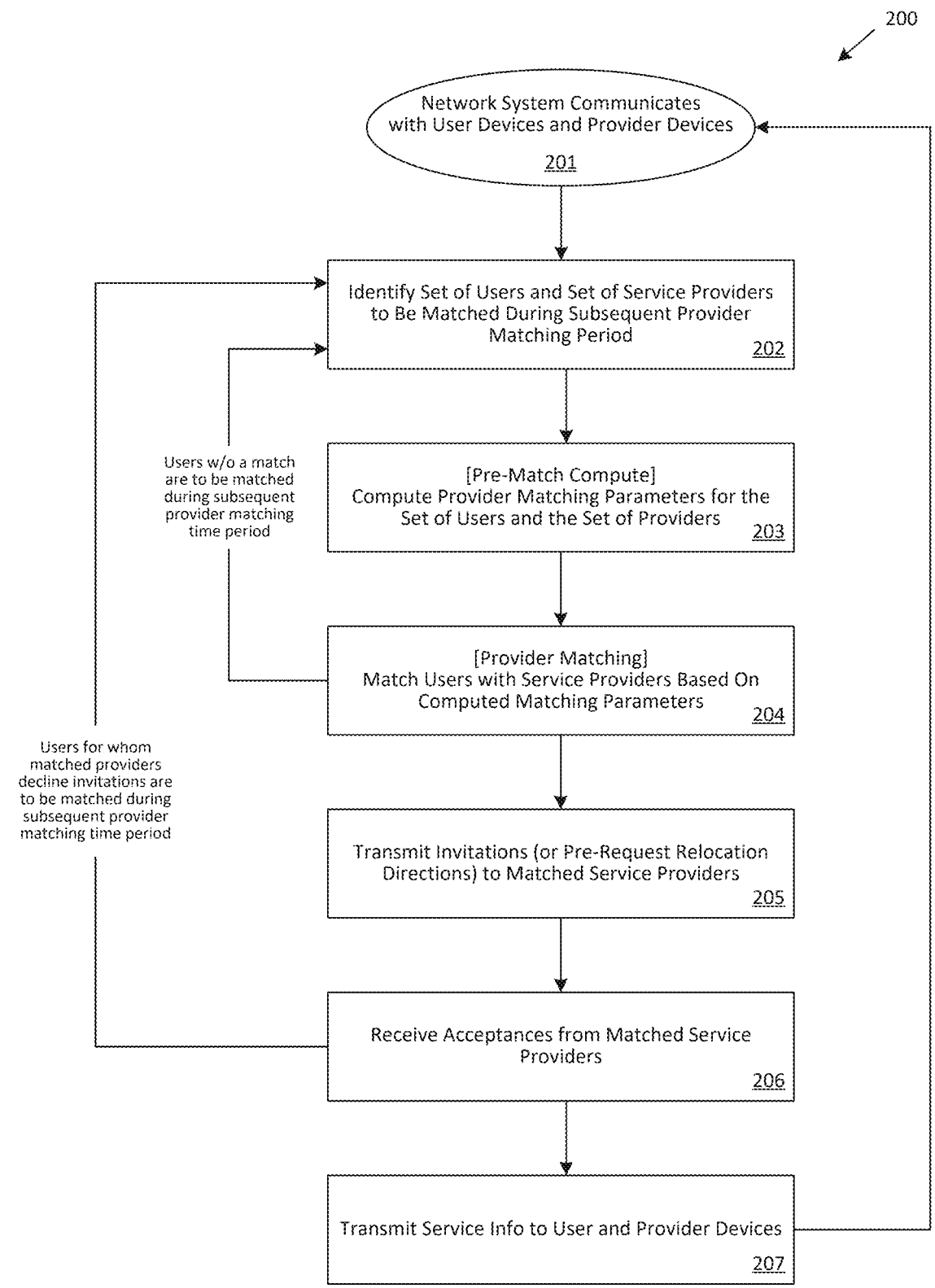
FIG. 2A is a flowchart describing an example method of a network system performing periodic provider matching for users and service providers, in accordance with examples described herein.

FIG. 2A is a flowchart describing an example method of a network system performing periodic provider matching for users and service providers, in accordance with examples described herein. In the below discussion of FIG. 2A, reference may be made to features and examples shown and described with respect to FIG. 1. For instance, the method 200 illustrated in and described with respect to FIG. 2A can be performed by the exemplary network system illustrated in FIG. 1.

Referring to FIG. 2A, the network system can perform the method 200 to periodically perform provider matching between available service providers and a set of users, including users who submitted service requests (post-request matching users) and certain prospective users who have not yet submitted service requests (pre-request matching users). Provider matching can be performed during provider matching time periods. For a post-request matching user, the network system can perform provider matching during the subsequent provider matching time period after the network system receives the corresponding service request. Similarly, for a pre-request matching user, pre-request matching can be performed during the subsequent provider matching time period after the network system determines to perform pre-request matching for the user.

The method 200 can be performed by the network system for a geographic region (e.g., San Francisco or a subregion within San Francisco, such as the Financial District of San Francisco) to match users and service providers within the geographic region. The network system (or other computer systems) can concurrently perform method 200 to match users and providers in other geographic regions, including adjacent or nearby geographic regions.

At step 201, the network system can communicate with user devices and provider devices across the region. At this step, the network system can receive service requests transmitted by user devices of requesting users within the region to perform provider matching for the requesting users. The network system can also receive context data (e.g., sensor data, user application interaction data, application status data, etc.) to determine whether to perform pre-request matching during a subsequent provider matching period for users who have not yet submitted service requests. Additionally, the network system can receive provider data indicating, for example, availabilities and locations of services providers within or near the region to determine available service providers who can be matched with users during the subsequent provider matching time period. Although step 201 is depicted as a single step of method 200, it is appreciated that the network system can be continuously in communication with user devices and provider devices to receive such data. For example, service requests, context data, and provider data can be received from user and provider devices while the network system performs steps 202 to 207 of method 200.

At step 202, the network system can identify, based on the data received from the user and provider devices, a set of users and a set of providers to be matched during the provider matching period. For the set of users, the network system can identify users within the region (e.g., based on location data generated by the user devices, or based on the users indicating start locations within the region) from whose devices the network system had previously received service requests. The network system can further identify, for inclusion in the set of users, users for whom to the network system will perform pre-request matching (pre-request matching users). This identification of pre-request matching users can be performed based on context data (e.g., user application interaction data, user application status data, sensor data, user profile data, etc.) as described herein with respect to, for example, FIGS. 1 and 2B-2E. The identification of pre-request matching users can also be dependent on a system load. For example, for a given provider matching time period for which a threshold number of users have submitted service requests, the network system can determine to not perform pre-request matching or reduce the number of pre-request matching users identified (e.g., by dynamically modifying a threshold value used to identify pre-request matching users) to properly allocate computing resources during the given provider matching time period. Furthermore, because the network system continuously receives service requests and context data from user devices and the provider matching is performed periodically, cutoff times can be associated with each provider matching time period. For example, for a given provider matching time period, the network system can identify users from whose devices service requests are received prior to a service request receipt cutoff time associated with the given provider matching time period. Similarly, for the given provider matching time period, the network system can identify users for whom the network system determines, prior to a pre-request matching determination cutoff time associated with the given provider matching time period, to perform pre-request matching. A service request from a user that is received by the network system after the request receipt cutoff time associated with the given provider matching time period can be matched with a service provider in a later provider matching time period. Similarly, if the network system determines, at a time after the pre-request matching determination cutoff associated with the given provider matching time period, to perform pre-request provider matching for the user, the network system can match perform pre-request provider matching for the user at a later provider matching time period.

The set of providers can be determined by identifying available (e.g., not matched with any user nor currently providing services to any user) service providers currently located within (or anticipated to be located within, based on current trajectory and speed) the region. The set of providers can further include occupied service providers (e.g., service providers who are in progress of providing services to users). The network system can selectively identify an occupied service provider to be included in the set of providers for matching with users based on the occupied service provider's service information and/or service progress. For example, the network system can determine that a service provider is in progress of providing services for a user to a location within the region (e.g., providing transport service to drop off the user at the location within the region) and is estimated to arrive at that location within the next two minutes. In response, the network system can identify the service provider to be included in the set of service providers for matching with users in the region during the subsequent provider matching time period. On the other hand, if the network system determines that the service provider currently en-route to drop off the user outside of the region (or outside of a distance threshold from the region) or is estimated to complete the currently in progress service later than a time threshold (e.g., five minutes or more), the network system can determine to not include the service provider in performing provider matching for the region in the subsequent provider matching time period.

At step 203, the network system can compute matching parameters for the set of users and the set of providers identified to be matched for the subsequent provider matching time period. This computation can be performed during a pre-match computation time period associated with the subsequent provider matching time period. In some examples, each provider matching time period (e.g., step 204) is preceded by a pre-match computation time period (e.g., step 203) during which matching parameters for the relevant users and service providers are computed so that the users and service providers can be matched during the provider matching time period.

According to examples, matching parameters are computed for each potential (or hypothetical) user-to-provider pairing from the set of users and the set of service providers. The potential user-to-provider pairings can be limited and may not include every possible user-to-provider pairing from the set of users and the set of service providers. For example, the network system can ignore (e.g., do not compute matching parameters for) a potential user-to-provider pairing of a first user and a first service provider based on the first user having submitted service request for specific service class (e.g., a luxury transport service) and the first service provider being associated with a different service class (e.g., an economy transport service, a rideshare transport service, etc.). Similarly, user-to-provider pairings may be ignored or filtered on the basis of user ratings or provider ratings (e.g., the network system may filter a potential user-to-provider pairing comprising a user with a user rating above a certain threshold and a service provider with a provider rating below a certain threshold). In yet another example, a user may have previously indicated (e.g., via the user application) that he or she does not wish to be matched with a certain provider, or vice versa, due to, for example, a bad prior experience. In response to such an indication (e.g., stored in the user profile or the service provider's profile), the network system can filter the potential user-to-provider pairing comprising the user and the service provider. In this manner, the network system can reduce the number of potential user-to-provider pairings prior to computing the matching parameters and can thus reduce system computation workload.

According to embodiments, the matching parameters computed for each user-to-provider pairing can include location-related parameters such as a current location of the service provider, a current location of the user, a start location where the user is to rendezvous with the service provider (e.g., as input by the first user within the service application executing on the user device, or determined based on location data generated by the user device), an estimated time of arrival of the service provider at the start location, an estimated time of arrival of the user at the start location, an estimated wait time of the user at the start location, and the like. The matching parameters computed for each user-to-provider pairing can further include context-related parameters such as a computed probability that the user will cancel the request, a computed probability that the service provider will decline the resulting invitation, and/or a computed probability that the service provider will cancel his or her acceptance. For pre-request matching, the network system can further compute a probability that the user will submit a service request within a certain time period as a context-related parameter used as a matching parameter for the user-to-provider pairing.

At step 204, the network system can match each of the set of users with a service provider from the set of service providers based on the matching parameters computed at step 203. In certain implementations, the network system matches the users and service providers as a group (e.g., batch matching). This batch matching can be performed periodically during provider matching time periods for different groups of users and service providers. In certain implementations, during a given provider matching time period, the network system performs provider matching on a group basis for the set of users for which provider matching is being performed during the given provider matching time period. The network system can match users with available service providers by performing a group optimization of the computed matching parameters. In some examples, the network system can perform optimization with an objective to minimize an aggregate measure of the set of users' wait times in rendezvousing with service providers (e.g., minimize an average wait time, minimize a median wait time). Variations can include ones in which outliers (e.g., users which have a wait time of 2× or greater than the median) are taken into consideration in the group optimization and ones in which outliers can be excluded (e.g., on the rationale that the outlier users have to wait a relatively long time for a service provider regardless of the group optimization). Some implementations can take a hybrid approach in which a subset of the set of users are included in the group optimization while for others (e.g., outlier users), the network system can perform optimizations on an individual basis to match them with service providers.

In some instances, the first service provider can be in the process of fulfilling another service request at the time the provider matching process is undertaken. In such instances, the first service provider can be identified for the first user based on a first estimated travel time from the current location of the service provider to the service location of the currently in progress service for another user and a second estimated travel time from the service location of the other user to the start location of the first user.

According to examples, the network system can perform provider matching by setting up and resolving a bipartite graph (or bigraph) representation of the set of users, the set of service providers, and the computed matching parameters. In such an implementation, the network system can set up the bipartite graph G as G=(U, P, E), where U is a first set of vertices of bipartite graph G representing the set of users, P is a second set of vertices of the bipartite graph G representing the set of providers, and E is a set of edges between U and P. Each of the edges E can have a corresponding value that is based on the computed matching parameters computed for the corresponding user-to-provider pairing. For instance, a first edge E1 between a first user U1 and a first service provider P1 can have an associated value that is based on the computed matching parameters for the potential user-to-provider pairing between U1 and P1. As described herein, the value of E1 can be computed based on location-based parameters of the U1 to P1 pairing (e.g., an estimated time of arrival of P1 at the start location of U1) and based on context-based parameters associated with the U1 to P1 pairing (e.g., a determined propensity of U1 to cancel the request after being paired with P1, a determined likelihood of P1 to accept an invitation to provide service to U1, and/or, in the case of U1 being a pre-request matching user, a determined propensity of U1 to submit a service request, etc.). The network system can be configured to resolve the bigraph by identifying user-to-provider pairings within the biagraph that optimizes an aggregate measure of edge values of all selected pairings (e.g., maximize or minimize the aggregate values, maximize or minimize or a statistical measure of the aggregate values, etc.). In one implementation, the computation of matching parameters and the setup of the bigraph can be performed during the pre-match computation time period (step 203) whereas the solving of the bigraph to identify user-to-provider pairings from the potential pairings can be performed during the provider matching time period (step 204).

During the provider matching process of a given provider matching time period, a user of the set of users may not be matched with any service providers. This can occur, for example, when the set of users exceeds in number the set of service providers or when no service provider of the set of service providers is within a threshold distance or travel time from the start location of the user. In response to the user being unmatched during the provider matching process, the network system can identify the unmatched user for provider matching during a subsequent provider matching time period. If the unmatched user was not matched with any service providers due to no service providers being within a threshold distance or travel time from the unmatched user's start location, the network system can determine to identify the unmatched user for matching after a timeout period (e.g., not during the provider matching time period immediately following the one during which the unmatched user was initially not matched with any service providers) on the basis on that performing provider matching immediately following the unsuccessful attempt may similarly yield an unsuccessful result. In addition, the network system can further associate a priority weighting with the unmatched user during the subsequent provider matching time period. The priority weighting can be increased with the wait time of the unmatched user to account for the time the unmatched user has been waiting for the network system to identify a match.

At step 205, the network system transmits invitation messages to the provider devices of the service providers matched with users who have already submitted service requests (post-request matching). In response to receiving an invitation message, the recipient provider device can display a prompt (e.g., a push notification, an in-app notification) for the service provider to accept or decline the invitation. In response to receiving an acceptance from the provider device (step 206), the network system can determine service information and transmit the service information to the user device and the provider device (step 207). Based on the received service information, the user device can display information pertaining to the matched service provider (e.g., name, picture, license plate number, color, and make of vehicle operated by the service provider) and information regarding the service being requested (e.g., ETA of the service provider to the start location, ETA to the destination location, estimated cost of the requested service, etc.) Similarly, based on the received service information, the provider device can present information pertaining to the matched user (e.g., name, picture, start location) and information pertaining to the service being provided by the service provider (e.g., turn-by-turn navigation directions from the service provider's current location to the start location of the user, etc.). Thereafter, the network system can repeat the steps 201 to 207 for the subsequent provider matching time period.

If a service provider declines his or her invitation, the user who was matched to the service provider is no longer matched with a service provider. In such a circumstance, the network system can re-perform provider matching for user during a subsequent provider matching time period, similar to unmatched users described above with respect to step 204.

For service providers who are matched with pre-request matching users (pre-request matching), the network system can perform different operations to enable the network system to perform optimally in anticipation of those users submitting service requests. In one example, the network system can simply classify or label a service provider who is pre-request matched with a user as unavailable to be matched with other users in anticipation of the pre-request matching user submitting a service request at a later time. In other words, a service provider that was determined to be optimal by the group optimization process performed by the network system can be pre-request matched with the user and held for the user until the user submits a service request. After the pre-request matching user submits a service request, the re-request hold for the service provider can be automatically converted to an invitation (e.g., an invitation to the provider device can be automatically transmitted in response to receiving a service request from the matched pre-request matching user). As a variation, the network system can transmit a pre-request relocation direction to the provider device to preemptively relocate the service provider in anticipation of receiving the service request from the matched pre-request matching user. For example, in response to receiving the pre-request relocation direction, the provider device can display information pertaining to a relocation of the service provider (e.g., to a current location of the matched pre-request matching user, to the start location inputted by matched pre-request matching user, or to a general pickup location in the area such as an airport pickup queue). In this manner, the service provider will have already been on his or her way to rendezvous with the pre-request matching user when the pre-request matching user submits a service request, thereby reducing system response time and latency. In addition or as an alternative, the network system can selectively determine to hold the matched service provider or transmit the pre-request relocation direction to the provider device. In one example, this selective determination can be based on the location of the pre-request matching user. For instance, if the pre-request matching user is determined to be at an airport or a high traffic location with a pickup queue, the network system can determine to transmit the pre-request relocation direction to the provider device. As another example, this selective determination can be based on the distance or estimated travel time from the service provider's current location to the start location of the user (or the user's current location). For instance, if the distance or estimated travel time exceeds a threshold value, the network system can determine to transmit pre-request relocation direction to the provider device.

Figure 2B:
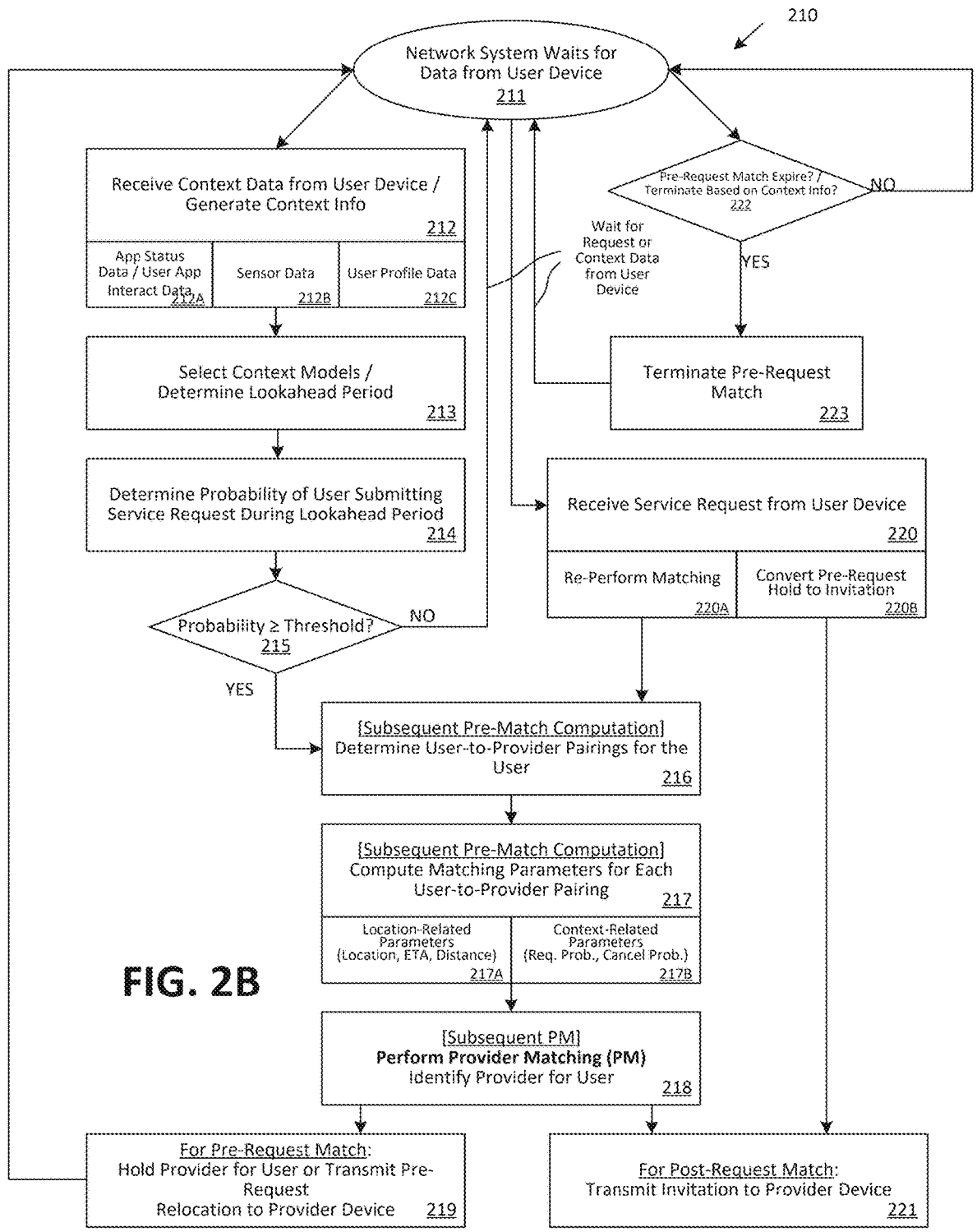
FIG. 2B is a flowchart describing an example method of matching requesting a user with a service provider, according to examples described herein.

FIG. 2B is a flowchart describing an example method of matching requesting a user with a service provider, according to examples described herein. In the below discussion of FIG. 2B, reference may be made to features and examples shown and described with respect to FIGS. 1 and 2A. For instance, the method 210 illustrated in and described with respect to FIG. 2B can be performed by the exemplary network system illustrated in FIG. 1. In comparison with method 200 illustrated in and described with respect to FIG. 2A, method 210 can be considered a subpart of method 200. In particular, method 210 of FIG. 2B can be viewed in the context of the network system performing a provider match operation for a given user, while method 200 of FIG. 2A describes performing periodic provider match operations for a plurality of users within a region.

Referring to FIG. 2B, at step 211, the network system can wait to receive data from for a user device of a user. The user can be any of a plurality of users registered with the network-based service. At any one time, the network system can be communicating with user devices of a small subset of the plurality of users who are actively interacting with (or have recently interacted with) the network-based service (e.g., requesting services, viewing service information, viewing service history, etc.) via their respective user devices. For the other users (e.g., inactive users), the network system can wait to receive data (e.g., service request, location data, context data, etc.) to trigger one or more operations such as the ones illustrated in FIG. 2B for those other users.

At steps 212 to 215, the network system determines whether to perform pre-request matching for the user. In other words, the network system determines whether to match the user with a service provider before receiving a service request from the user. In the context of FIG. 2A, steps 212 to 215 can be viewed as a part of step 202 of FIG. 2A, in which the network system determines a set of users to be matched with providers for a subsequent provider matching time period.

At step 212, the network system receives context data from the user device and/or generate additional context information in response to receiving data from the user device. Although step 212 is shown as one step in FIG. 2B for simplicity, the user device can periodically or continuously transmit context data to the network system or can transmit multiple sets of context data over a period of time to the network system in response to events or actions performed on the user device (e.g., updating of sensor data, user interaction with the user application, etc.). The user device can transmit different types of context data to the network system, including data indicating a status of the user application executing on the user device and/or data indicating user interactions with the user application (212A), and sensor data generated by one or more sensors onboard the user device (e.g., accelerometer data, barometer data, location data, etc.) (212B). In addition, the network system can generate context information based on user profile data (212C) derived from a user profile maintained for the given user.

At step 213, the network system can select context models for analyzing the context information received from the user device (or generated by the network system) and/or determine a lookahead period. The lookahead period can refer to a future period of time and the network system can determine a probability that the given user will submit a service request during the lookahead period based on contextual information (e.g., received or generated during step 212) using context models, as described herein. In some examples, the lookahead period can be an input parameter to one or more of the context models. And the lookahead period can be determined dynamically for the given user (e.g., based on contextual information, user profile data, etc.). In this manner, the network system's lookahead determination of the probability of the given user submitting a service request can be varied depending on the given user's specific circumstances. For example, the network system can determine (e.g., based on location data transmitted by the user device or based on a start location input by the given user with the user application) that the given user is interacting with the user application while the given user is located at a location where users typically interact with the network-based service in a predictable manner before submitting service requests (e.g., at an airport location). In response, the network system can adjust the lookahead period accordingly to better suit the given user's circumstances in requesting the network-based service.

In addition or as an alternative, different sets of context models for determining the probability of the given user submitting a service request can be created and trained for a specific set of context information. And the network system can select, at step 213, the appropriate set of context models to use for the given user based on the context information received or generated at step 212. As an example, a specific set of context models can be created and trained to model user behavior in submitting service requests at a specific location (e.g., at an airport location) and, in response to determining that the user is interacting with the network-based service at the specific location, the network system can select the specific set of context models for the specific location to determine the likelihood the given user will submit a service request. As another example, a set of context models can be created and trained to model user behavior in submitting service requests at a specific location in connection with other contextual information (e.g., at an event venue location and after the end of an event such as a concert or a sporting event). In other examples, specific context models can be trained and selected based on the time or day (e.g., weekend, weekday, time of the day, day of the week, etc.). In these examples, by selecting specific context models based on the context information associated with the given user, the network system can more accurately determine the likelihood of the given user submitting service requests based on the data received or generated at step 212.

At step 214, the network system can determine the probability of the user submitting a service request during the lookahead period based on the context information collected using the appropriate context models and can proceed. Depending on the determined probability, the network system can determine whether to perform pre-requesting matching for the given user (step 215). In one implementation, if the determined probability is equal to or above a threshold value (e.g., indicating that the user is as likely or more likely than the threshold probability to submit a service request during the lookahead period), the network system can proceed to step 216. On the other hand, if the determined probability is less than a threshold value (e.g., indicating that the user is less likely than the threshold probability to submit a service request during the lookahead period), the network system can determine to not perform pre-request matching for the given user during the subsequent provider matching period. For example, the context information collected by the network system can indicate that the given user has not interacted with the user application beyond a certain point and, based on context models trained to model user behavior, this indicates that the user is unlikely to submit a service request within the lookahead period (e.g., within the next 2 minutes). In response, the network system can wait for additional data from the user device (e.g., return to step 211) before matching the given user with a service provider. For example, the network system can wait until the given user actually submits a service request to match the given user with a service provider. In addition or as an alternative, the network system can wait until additional context information is received or generated for the given user such that an updated probability can be determined for the given user that exceeds the threshold value.

Although steps 214 to 215 are illustrated and described with respect to a determined probability of the user submitting a service request and whether that determine probability exceeds a threshold value, other implementations may simply determine a binary output as to whether to perform pre-request matching for the user without determining a specific likelihood of the user submitting a service request. For example, the context models 153 of FIG. 1 can be trained and implemented to simply determine, based on received context data, a binary output as to whether to perform pre-request matching for the user. In yet other implementations, the determined probability of the user submitting the service request is not used as a threshold determination of whether to perform the pre-request matching for the user. Rather, the determined probability of the user submitting a service request can be used as a matching parameter in performing the pre-request matching for the user. In this manner, the identification of a pre-request match for the user can still be performed based on the determined probability.

For a pre-match request where the first user has not yet entered the desired service class, the network system can examine the past history of the first user to determine the service class the user is most likely to request. For example, the network system can determine, based on the user profile data of the first user, that the user typically requests an economy service at the relevant time (e.g., weekday mornings). In response, the network system can pre-request match the user with an economy class service provider when context data is received on a weekday morning. Similarly, where the first user has not yet entered a start location, the network system can utilize received context data and/or user profile information to determine the start location in pre-request matching the user with a service provider. For instance, the start location for the pre-match can be determined to be the current location of the first user or can be a frequent location from where the user requests service at the relevant time and/or day of the week. As an example, the first user's current location can be determined to be an event venue or an airport based on location data transmitted by the user device. In response, the network system can determine the start location for the pre-request match to be the nearest designated pickup location for the current location (e.g., an airport pickup location, an event venue pickup location, a mass egress location designated for the location, etc.).

At steps 216 to 218, the network system matches the user with a service provider. In particular, at step 216, the network system can determine a plurality of potential user-to-provider pairings for the user, each comprising the user and a potential service provider who can be matched with the user. At step 217, during a pre-match computation period, the network system can compute matching parameters for each of the user-to-provider pairings. And at step 218, during the provider matching time period, the network system can match the user to a service provider based on the matching parameters computed at step 217. In the context of FIG. 2A, steps 216 to 218 can be viewed as corresponding to steps 203 and 204 of FIG. 2A, in which the network system computes matching parameters and performs provider matching for the set of users under consideration for provider matching for a given provider matching time period.

Referring back to step 216, according to embodiments, the network system can determine a plurality of user-to-provider pairings for the user. In the broader context involving the set of users under consideration, the network system can compute each potential user-to-provider pairing for the set of users and for the set of providers, as described with respect to FIG. 2A. More specifically for the user under consideration in FIG. 2B, for performing pre-request matching for the user, the network system can first determine a plurality of potential user-to-provider pairings for the user. The plurality of potential user-to-provider pairings can be determined based on context data transmitted by the user device (e.g., at step 211). For example, the context data can indicate that the user is interacting with the user application and is in the process of previewing information within the user application for a service request for a particular service class (e.g., interacting with the user application for submitting a service request for a rideshare transport service, such as inputting a start or a destination location, selecting the rideshare transport service from a plurality of available transport service classes, etc.). In response, the network system can determine the plurality of user-to-provider pairings for the user to only including pairings with providers who are providing the particular service class. As another example, if the network system determines, based on the context data, that the user is likely to request service to a destination location that is beyond a threshold distance from the start location of the user (or the current location of the user), the network system can determine the user-to-provider pairings to only include pairings with service providers who have indicated an availability to provide distance services. For pre-request matching, the network system can further make these determinations based on context data derived from the user's profile information. For example, if the user's profile data indicates the user frequently requests a ridesharing service class for requesting transport services to and from work, the network system can determine the user-to-provider pairings to only include service providers of the ridesharing service class when the user is interacting with the user application on weekday mornings while at the user's home or on weekday evenings while at the user's place of work. In contrast, if the network computer system is performing post-request matching for the user, the network computer system can determine the potential user-to-provider pairings based on the request submitted by the user (e.g., start location, destination location, class of service, etc.). Furthermore, user profile data can be used to determine user-to-provider pairings for both pre-request matching and post-request matching. For example, the user's user ratings (and the providers' ratings) and may be used in determining user-to-provider pairings for the user. Similarly, the user's indication of unfavorable providers can be used to determine the user-provider pairings for the user.

At step 217, the network system determines a respective set of matching parameters for each of the user-to-provider pairings determined at step 216. The matching parameters can include location-related parameters (217A) such as a current location of the first service provider, a current location of the first user, a start location where the first user is to rendezvous with the first service provider (e.g., as input by the first user within the service application executing on the user device, or determined based on location data generated by the user device), an estimated time of arrival of the first service provider at the start location, an estimated time of arrival of the user at the start location, an estimated wait time of the first user at the start location. The estimated time of arrival can be computed based on a current location of the first service provider (e.g., as indicated based on location date generated by the provider device of the first service provider), the start location (e.g., as input by the user, or as indicated by location data generated by the user device of the first user), information pertaining to current traffic conditions, and mapping/navigation data. In some examples, the network system can also selectively utilize an anticipated location of the first service provider instead of the current location in determining the estimated time of arrival. For example, the network system can determine that the service provider is traveling at a high rate of speed on a highway or expressway (e.g., based on monitoring location data transmitted by the provider device of the service provider). In response to such a determination, the network system can determine to generate an anticipated location of the service provider based on the speed of the service provider, location data, and map data to determine the anticipated location of the service provider (e.g., in 2 minutes). The network system can utilize the anticipated location of the service provider in determining one or more of the matching parameters (e.g., the estimated time of arrival of the service provider at the start location).

In some examples, the matching parameters can also include context-related parameters (217B) such as the probability of the user submitting a service request (e.g., as computed at step 204), a probability of the user canceling the service request, a probability of the service provider not accepting the resulting invitation (or canceling the acceptance), etc. The context-related parameters can be computed using context models that are trained using historical data relating to the network-based service. Examples of such context models can include the user request submission context model 153A, user cancellation context model 153B, provider acceptance context model 153C, and the provider cancellation context model 153D illustrated and described with respect to FIG. 1. As an example, for the first user-to-provider pairing comprising the first user and the first service provider, one context-related parameter can be the probability of the first user submitting a service request (e.g., as computed at step 204), if the network system is performing pre-request matching for the first user during the provider matching period in question. Another context-related parameter can be the probability of the user cancelling the service request and can be determined for the first user-to-provider pairing using the user cancellation context model 153B based on factors such as the estimated time of arrival of the first service provider at the start location associated with the first user, the estimated cost for the requested service, the estimated time of arrival of the user at the destination location, a distance between the first user's current location and the start location, etc. Yet more context-related parameters computed for the first user-to-provider pairing can be the probability of the first provider accepting the resulting invitation and/or the probability the first provider canceling his or her acceptance to the invitation. These probabilities can be computed using the provider acceptance context model 153C and/or the provider cancel context model 153D as described herein.

According to embodiments, different matching parameters can be computed for users having submitted service requests as compared with users who are being matched with service providers prior to submitting service requests. For example, for pre-request matching for a first user, the matching parameters can include the determined probability of the user submitting a service request (e.g., such as the probability determined at step 214) or a parameter derived therefrom. In comparison, for post-request matching for a second user, the matching parameters do not include such a probability (or the probability can be represented in the computations as 1 or 100%).

At step 218, the network system can identify a service provider based on the matching parameters for the user-to-provider pairings for the user computed at step 217. The provider matching performed for the user at step 218 can be part of the provider matching performed for the set of users and the set of providers (e.g., step 204 of FIG. 2A). The providers matched with the set of users can be identified based on one or more optimization objectives being applied to the computed matching parameters. Furthermore, providers can be matched with the set of users based on one or more group optimization objectives to optimize an aggregate measure (e.g., mean, median, 25 percentile, 75 percentile, a standard deviation, or some other statistical measure) of one or more of the matching parameters across the set of users (or a subset thereof) being matched. For example, the network system can identify service providers to minimize an aggregate measure of wait times of the users to rendezvous with the service providers (e.g., as determined based on the ETA of the matched service providers to the respective start locations, or as determined based on the difference between the ETAs of the matched service providers and the users to the respective start locations, etc.). Thus, for the user under consideration in FIG. 2B, the matched service provider can be one who is not the closest of the available service providers to the start location of the user. Rather, other users of the set of users are also taken into consideration when identifying service providers for the set of users as a group. Therefore, the service provider identified for the user can be based on matching parameters computed for user-to-provider pairings that do not involve the user (but involving other users of the set of users being matched during the provider matching time period).

At step 219, the network system performs operations following a service provider being identified as a pre-request match for the user. In certain implementations, the network system can hold the service provider (e.g., a pre-request hold) for the user in anticipation of the user submitting a service request after the service provider has been identified for the user by the network system. In various contexts, a pre-request hold can include reserving the service provider for the user and classifying the service provider as not available for provider matching with other providers during subsequent provider matching time periods while the pre-request hold is effective. In some examples, in response to the service provider being pre-request matched with the user, the network system can transmit a set of data to the provider device to cause the provider device of the service provider to display a notification informing the service provider to expect an invitation shortly. In some implementations, in response to the service provider being pre-request matched with the user, the network system can transmit a pre-request relocation direction to the provider device to cause the provider device to display directions for the service provider to relocate in anticipation of receiving the service request from the user.

After the pre-request match operations have been performed at step 219, the network system can wait for data to be received from the user device (e.g., step 211). The network system can receive a service request from the user device (step 220). The network system further can determine to cancel the pre-request hold (or the pre-request relocation direction) for the service provider based on additional context data received from the user device (e.g., after the pre-request match has been made) or based on a not receiving the service request within an certain period of time after pre-request matching the service provider with the user (step 222).

Referring to step 220, the network system can receive a service request from the user device after the user has been pre-request matched with a service provider as described above based on context data received from the user device (or generated by the network system). In response to receiving the service request after pre-request matching the user with the service provider, the network system can re-perform matching for the user as a post-request match (step 220A). For example, the network system can perform steps 216 to 218 in response to receiving the service request during a subsequent provider matching time period after the request is received. The service provider who is pre-request matched with the user may or may not be identified for the user during this post-request match. In most cases, the pre-request matched service provider is post-request matched with the user because it is mostly likely that the service provider who is pre-matched with the user will continue to be the optimal service provider for the user when the user submits the service request. In such instances, by pre-request holding the service provider for the user—who is determined to be likely to submit a service request based on context data—the network system can ensure that the optimal service provider for the user is already allocated for the user and available to provide services for the user when the user does submit a service request. In some cases, the pre-request matched service provider may no longer be the optimal service provider for the user at the time the user submits the service request due to for example, another more optimal service provider becoming available within the region. In such cases, the provider selection process can identify the more optimal service provider to be matched with the user either on an individual optimization basis for the user or on a group optimization basis for the set of users being matched during that provider matching time period. In these cases, by performing another provider matching process for the user after the user submits a service request, the network system maintains flexibility to re-assign a more optimal service provider for the user.

As an alternative, in response to receiving the service request after pre-request matching the user with the service provider, the network system can automatically transmit an invitation to the service provider pre-request matched with the user (step 220B). In doing so, the network system can avoid re-performing provider matching and can transmit the invitation as soon as the service request is received from the user (as compared with after the subsequent provider matching time period in comparison with step 220A).

As another alternative, the network system can dynamically determine whether to proceed via 220A (perform provider matching for user in response to receiving the service request from the user device even though a service provider is pre-request matched with the user based on context data) or via 220B (automatically transmit invitation to pre-request matched service provider in response to receiving the service request from the user device). For instance, the network system can determine to proceed via 220A based on the number of service providers available for matching with users or a comparison of the number of service providers available for matching with the number of users for matching in a given provider matching time period. In effect, the network system can determine to re-perform matching for the user in response to receiving the service request from the user device when the number service providers available for matching (or when the ratio of service providers to users) falls below a critical threshold. The network system can also selectively proceed via 220A or 220B based on location and/or time. For instance, for a first geographic region managed by the network system (e.g., a high traffic area such as an airport), the network system can be configured to proceed via 220B to automatically transmit an invitation in response to receiving the service request from the user without re-performing provider matching for the user. In contrast, for a second geographic region, the network system can be configured to proceed via 220A in re-performing provider matching for the user in response to receiving the service request from the user device.

In addition or as an alternative, the network system can determine to proceed via 220A or 220B based on an indicator of whether the pre-request match for the user is still likely to be an optimal service provider for the user at the time the service request is received. For instance, the indicator can be a time elapsed between when the pre-request match was made for the user and when the service request for the user was received. A short elapsed time would indicate that the pre-request match for the user is likely to still be an optimal service provider for the user when the service request is received. Thus, if the time elapsed is below the threshold value, the network system can proceed via 220B to automatically transmit an invitation to the pre-request matched service provider in response to receiving the service request from the user device. On the other hand, a long elapsed time would indicate that the pre-request match for the user is unlikely to still be an optimal service provider for the user when the service request is received. Thus, if the time elapsed exceeds a threshold value, the network system can determine to proceed via 220A to perform a post-request match for the user in response to receiving the service request from the user device. In other implementations, the network system can utilize other indications of the likelihood that pre-request matched service provider is still an optimal service provider for the user at the time the service request is received to determine whether to proceed via 220A or via 220B, such as an aggregate measure (e.g., mean, median, etc.) of the wait times of users to rendezvous with service providers in the region. For example, if the aggregate measure of wait times exceeds a threshold value in the region during prior provider matching time periods before the service request was received by the network system, the network system can determine to proceed via 220A to perform post-request matching for the user. On the other hand, if the aggregate measure of wait times is below the threshold value, the network system can proceed via 220B.

At step 221, the network system transmits an invitation to the provider device of the service provider who is post-request matched with the user. The provider device can display a prompt for the service provider to accept or decline the invitation in response to receiving the invitation. If the service provider accepts the invitation, the network system can facilitate the service request to be fulfilled by the service provider by, for example, transmitting service information and turn-by-turn navigation directions to the user device and the provider device. On the other hand, if the service provider declines the invitation, the network system can re-perform provider matching for the user during the subsequent provider match period to identify another service provider for the user.

According to embodiments, a pre-request match can expire or can be terminated by the network system. As described above, after the service provider has been pre-request matched with the user, the network system can wait (e.g., at step 211) for additional data from the user device such as additional context data or a service request (step 222). If the network system does not receive a service request from the user device within a certain time (e.g., before an expiration time associated with the pre-request match), the pre-request match can expire (step 223). When the pre-request match expires or is terminated, the service provider can be classified as available for matching with other users during the subsequent provider matching time period. The network system can further determine to terminate the pre-request match based on additional context data received from the user device. For instance, if the context data received after the pre-request match indicates that the user is no longer likely to submit a service request, the network system can terminate the pre-request match. Such context data can include data indicating user's interactions with the user application (e.g., user interactions that undo prior user interactions in proceeding with the flow to submit a service request such as a "Back" user interface feature) or data indicating that the user application is executing in the background rather than the foreground on the user device. In certain implementations, the determination to terminate the pre-request match can be made based on a machine-learned model trained to estimate the likelihood that the user will not submit the service request based on the context data received after the pre-request match was made.

Figure 2C:
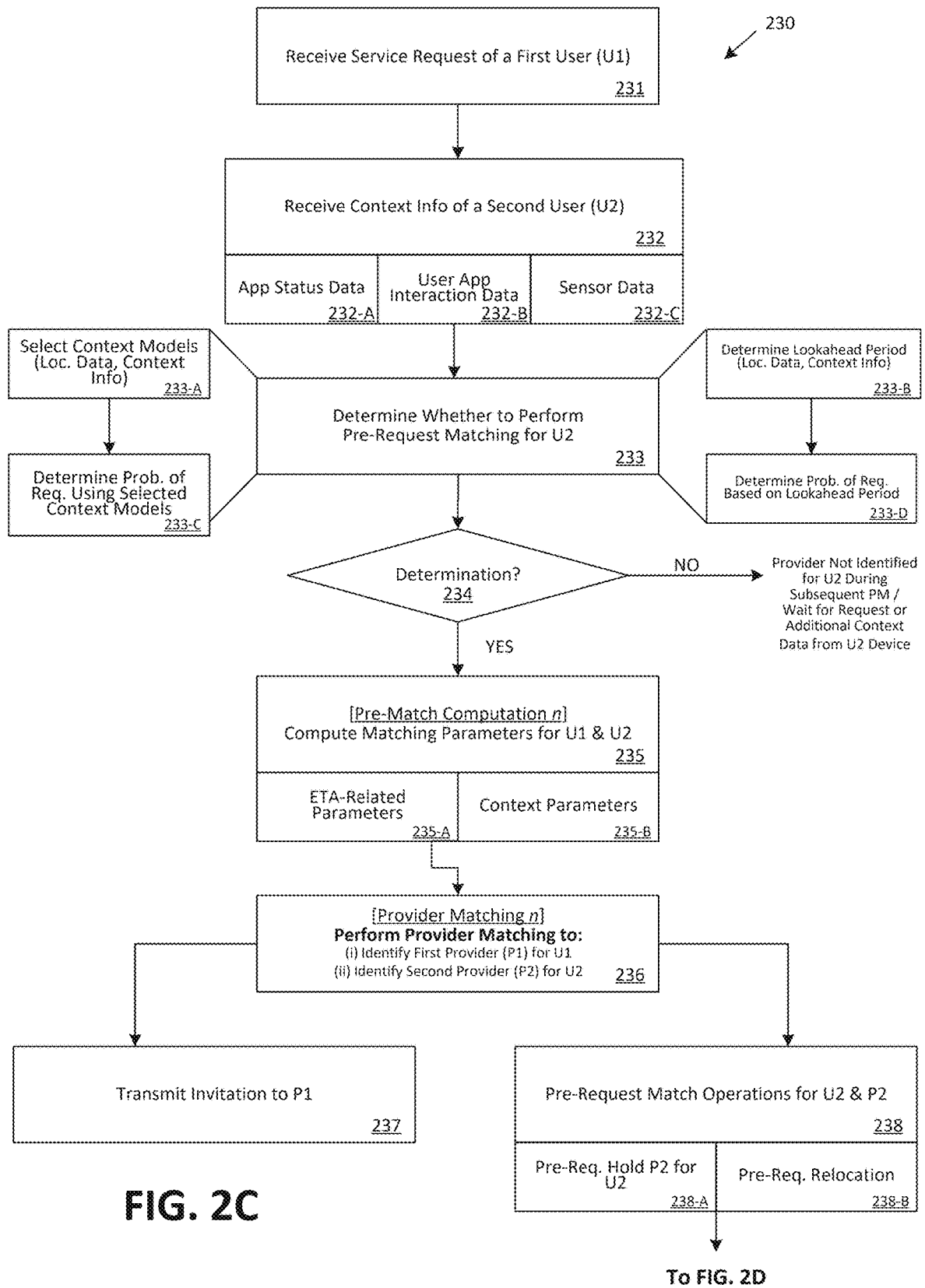
FIG. 2C-2D are flowcharts describing an example method of performing a pre-request provider matching for a user based on context information, according to examples described herein
Figure 2D:
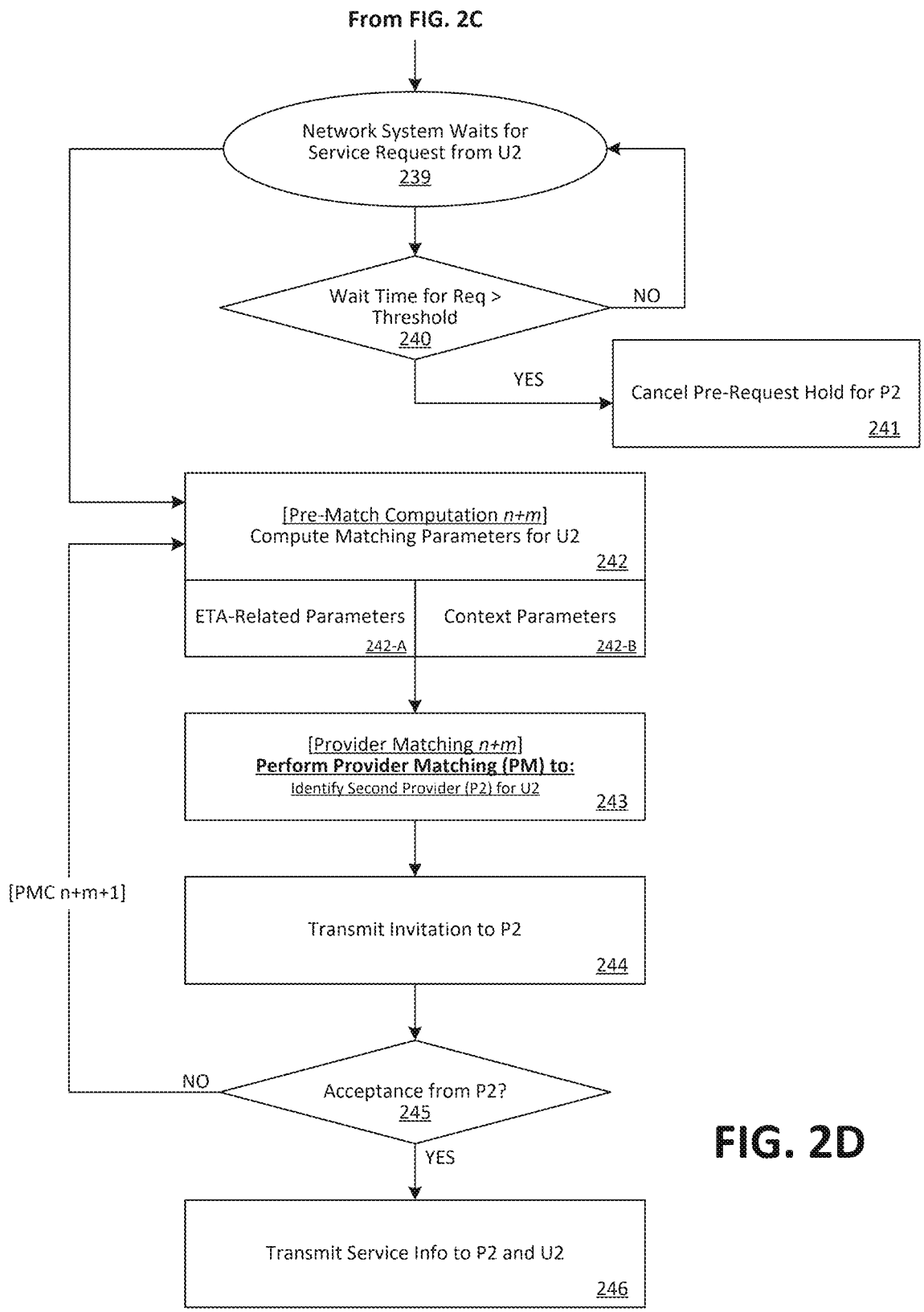

FIG. 2C-2D are flowcharts describing an example method of performing a pre-request provider matching for a user based on context information, according to examples described herein.

The method 230 depicted in FIGS. 2C-2D can be performed by a network system that manage a network-based service within a geographic region. The geographic region can be a metropolitan area (e.g., San Francisco, or San Francisco Bay Area) or a sub-region within the metropolitan region (e.g., Financial District of San Francisco). At step 231, the network system can receive a service request of a first user (U1) from U1's device. At step 232, the network system can receive context information of a second user (U2) from U2's device. The context data received from U2's device can include application status data 232-A, user application interaction data 232-B, and sensor data generated by the U2's device 232-C. Furthermore, the network system can retrieve profile information relating to U2 as additional context data to be used in the pre-request matching of U2.

At steps 233 and 234, the network system can determine whether to perform pre-request matching for U2 in the subsequent provider matching time period (provider matching n, the n-th provider matching time period, where n is an integer value). The determination can be based on context data received from the user device and/or derived from the user profile of U2.

In certain implementations, the network system can utilize context models to determine whether to perform pre-request matching for U2). Context models can be machine-learned models trained using historical data of the network-based service (e.g., historical data of the population of users within a region, historical data of users who submit service requests within the region in which U2 is currently located, and/or historical data of U2). In particular, one context model that can be used to determine whether to perform pre-request matching for users can be a user request submission context model that is trained using historical data linking context data (e.g., user application status, sensor data, user application interaction data, user profile data) with a propensity or likelihood of users to submit service requests within a given time period. In utilizing context model(s) to determine whether to perform pre-request matching for U2, the network system can apply the context data of U2 as input to the context model(s).

According to embodiments, as part of the step 233 to determine whether to perform pre-request matching for U2, the network system can select an appropriate context model (step 233-A). In one variation, different context models can be trained for different geographic regions managed by the network system to model different behaviors of users across the geographic regions and the network system can select the appropriate context model for U2 based on the current location of U2. As an example, the Financial District of San Francisco may exhibit different patterns as compared with the Richmond District of San Francisco in linking context data with a propensity of users to submit service requests. And a specific context model can be generated and trained using historical data associated with instances of the network service originating from the Financial District (e.g., start location located within Financial District). In response to determining that U2 is located within the Financial District, the network system can select the specific context model for the Financial District to determine whether to perform pre-request matching for U2.

According to some examples, context models can also be selected based on context information. More specifically, as one example, different context models can be generated and trained for different times and/or days of the week. For example, for the Financial District of San Francisco, there can be multiple user request submission context models—one can be specific to weekday mornings, another can be to weekday evenings, and yet one more can be specific to weekends—where each user request submission context model is trained to model a specific subset of user behavior. Alternatively, the current time and/or day of the week can be input(s) that are supplied to the context models rather than being used to select the appropriate context models. In either implementation, the determination of whether to perform pre-request matching for U2 can be made based, at least in part, on the context information such as the current time and/or day of the week.

In some examples, the network system can dynamically determine a lookahead period based on, for example, location data and other context information associated with U2 (step 233-B). Regarding the lookahead period, if the network system determines that U2 is likely to submit a service request during the lookahead period, the network system can determine to perform pre-request optimization. Accordingly, by adjusting the lookahead period, the network system's determination of the probability of the given user submitting a service request can be varied depending on U2's specific circumstances. For instance, the lookahead period can be determined based on U2's location. In this manner, an airport location can have a different lookahead period compared to an urban location.

Thus, the determination of the probability of U2 submitting a service request within the lookahead period can be determined based, at least in part, on the selected context model (step 233-C) and the determined lookahead period (step 233-D).

If at step 234, the network system determines not to perform pre-request matching for U2, then U2 will not be matched with a service provider during provider matching n. The network system can continue communicating with U2's device and wait to receive additional context data, which can cause the network system to determine to perform pre-request matching during a provider matching time period after provider matching n. Similarly, the network system can wait to receive a service request from U2's device and, in response, can perform post-request matching for U2.

At step 235, during pre-match computation time period n, the network system can compute matching parameters for U1 and U2. The matching parameters can include ETA related parameters 235-A and context related parameters 235-B.

At step 236, during provider matching n, the network system performs provider matching to identify a first provider (P1) for U1 and a second provider (P2) for U2. For simplicity, in this illustrated example, the first user and the second user comprise the set of users being matched with service providers. The first provider and the second provider can be identified based on a group optimization objective to, for example, minimize a total waiting time for the first user and the second user.

At step 237, an invitation is transmitted from the network system to P1, who is post request matched to U1. At step 238, pre-request match operations are performed for U2 and P2. For example, the network system can hold P2 for U2 (e.g., classifying P2 as unavailable to be matched with other users) (238-A). As another example, the network system can transmit pre-request revocation directions to the provider device of P2 (238-B). After the pre-request match is made for U2, the network system can wait for a service request to be transmitted from the device of U2 (step 239). If the wait time for the request exceeds a threshold limit, the network system can terminate the pre-request match between P2 and U2 (steps 240 and 241).

In response to receiving the service request from the user device of U2, the network system can perform post-request matching for U2. In alternative implementations, post-matching is not performed for U2 and an invitation is transmitted to the service provider who is pre-request matched with U2 (P2) in response to receiving the service request from the user device of U2. The post-request matching for U2 can be performed during provider matching time period n+m, where m is an integer value and n+m denotes the m-th pre-match computation time period after the n-th provider matching time period, during which U2 was pre-request matched with P2. The value of m in this instance would depend on how long when the service request was received from the user device of U2.

To perform post-request matching for U2, the network system can compute matching parameters for U2 during the pre-match computation time period n+m (e.g., the pre-match computation time period for the provider matching time period n+m) (step 242). The matching parameters for U2 at this step can include ETA-related parameters 242-A (e.g., current locations of the service providers relative to the pickup location of U2, estimated times of arrival of the service providers to the pickup location of U2, and the like). The matching parameters for U2 can also include context parameters 242-B (e.g., a determined propensity of U2 to cancel a service request after a match with a given service provider, a determined propensity of the given service provider to decline the invitation to fulfill U2's service request, and the like). In this manner, such propensities of the service providers and U2 can be factored into identifying an optimal post-request match for U2. For instance, if U2 is determined to be likely to cancel the service request after matching with a given service provider (e.g., due to excessive wait time, due to a rating associated with the service provider, etc.), such a likelihood can be factored into the matching process to avoid matching U2 with such a service provider. At step 243, during the provider matching time period, the network system can perform post-request matching for U2 based on the matching parameters computed at step 242. The network system also identifies matches for other users who are to be matched with service providers during the provider matching time period n+m based on their respective computed matching parameters. In certain embodiments, the network system can identify the optimal match for U2 by resolving a bipartite graph. In other implementations, the network system can perform other types of multivariate optimizations (e.g., performing Markov chain Monte Carlo optimizations, using heuristic algorithms, etc.) to identify optimal service providers for U2 and the other users. As illustrated in FIG. 2D, P2 is again identified as the optimal service provider for U2. Depending on the circumstances, a different service provider can be identified for U2 during this process.

At step 244, an invitation is transmitted to the service provider matched with U2 (as illustrated in FIG. 2D, P2). At step 245, the network system determines whether P2 has accepted or declined the invitation. If P2 declined the invitation, the network system can re-perform the matching process for U2 in a subsequent provider matching period (e.g., pre-match computation period n+m+1). If P2 accepts the invitation, the network system can, at step 246, transmit service information to P2 and U2 to facilitate the fulfillment of U2's service request by P2. For instance, the network system can transmit to U2's user device information relating to P2's rendezvous with U2 at U2's pickup location (e.g., license plate and vehicle information of P2, a map display of the pickup location, walking directions to the pickup location, etc.). The network system can further transmit to the service provider device of P2 navigation directions to the pickup location of U2, identification information of U2 (e.g., name, picture, etc.), and the like to enable P2 to rendezvous with U2.

Figure 2E:
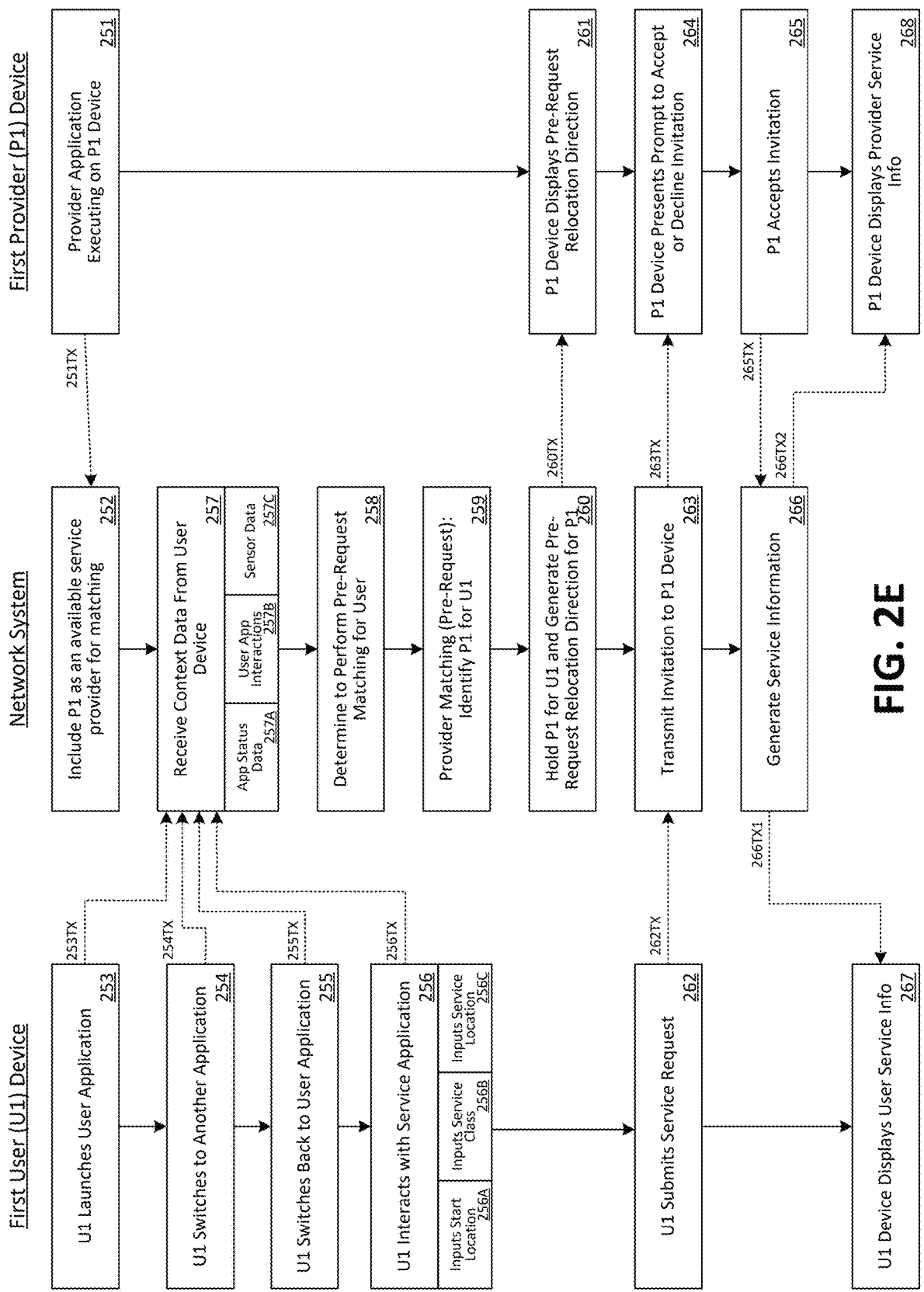
FIG. 2E is a flowchart describing example steps of and communications between a network system, a user device, and a provider device during a pre-request matching process and a post-request matching process, according to examples described herein.

FIG. 2E is a flowchart describing example steps of and communications between a network system, a user device, and a provider device during a pre-request matching process and a post-request matching process, according to examples described herein.

At step 251, the provider device of a first service provider executes a provider application. The provider device can transmit data (251TX) to the network system. The data transmitted from the provider device to the network system can include provider location data generated by one or more geo-aware resources of the provider device (e.g., GPS, GLONASS, BeiDou, or Galileo receiver(s)). In response to receiving the provider data 251TX, the network system can include the first service provider as an available service provider for matching with users in the subsequent provider matching time period (step 252).

At step 253, a first user launches the user application on a user device. After being launched on the user device, the user application opens in an initial state (e.g., ready to accept user interactions to begin a user interface flow to submit a service request) and executes in the foreground on the user device. In response to the user launching the user application, the user device is configured to transmit a first set of context data 253TX indicating the launch of the user application on the user device. The context data 253TX can further indicate the user's location (e.g., as generated by one or more geo-aware sensors on the user device).

After launching the user application, the first user switches from the user application to another application on the user device (step 254). In connection with this user application status, the user device can transmit a second set of context data 254TX to the network system to indicate that the user application is executing in the background rather than in the foreground.

At step 255, the first user switches back to the user application on the user device so that the user application is again executing in the foreground on the user device. In response to the user application being switched to the foreground on the user device, the user device can transmit a third set of context data 255TX to the network system to indicate the status of the user application.

At step 256, the user can interact with the user application within the user interface flow to submit a service request. For example, the user can input a start location where a service provider is to rendezvous with the user (step 256A). The user can further input a service location where the service provider is to drop-off the user (step 256C). The start and service locations can be input by the user as addresses, geographic coordinates, or as landmark/place of interest names. The locations can also be input by the user via interacting with a map feature (e.g., placing a pin on a map to indicate a location). Furthermore, the start location can be automatically determined by the user application without user input based on location data generated by the user device. Furthermore, the user can input a service class such as a rideshare class, an economy transport class, a luxury transport class, etc. (step 256B).

As the user interacts with the user application, the user device transmit context data 256TX to indicate the user's interactions with the user application as these interactions occur in real time. For instance, a set of context data can be transmitted to the network system to indicate to the network system that the user has entered a start location. Another set of context data can be transmitted to the network system as the user enters a service class to indicate to the network system that the user is entering or has entered a service class within the user application. A set of additional context data can be transmitted to the network system to indicate that the user has entered or is entering a destination location within the user application.

At step 257, the network system receives the context data transmitted by the user device. As described above, the context data received by the network system can include application status data (257A) such as user application launch signal (253TX) and/or the user application foreground/background indication (254TX and 255TX). The received context data can further include user application interaction data (257B) transmitted by the user device at 256TX. Furthermore, the user device can be caused by the network system to periodically or continuously transmit sensor data to the network system after the user application is launched. The received sensor data (257C) can include location data, barometer data, accelerometer data, ambient light sensor data, etc. that can be used in the determination a likelihood of the first user submitting a service request.

At step 258, the network system determines, based on the received context data, to perform pre-request matching for the user. The determination can be made in response to determining, based on the context data, that the first user is likely to submit a service request within a lookahead period. This determination can be made using one or more machine-learned models and the received context data as inputs to the models. The machine-learned models can be trained based on behavior of a population of the user or can be specifically trained for the first user based on the first user's past behavior in interacting with the user application in submitting service requests.

At step 259, the network system performs pre-request matching for the first user to identify a first service provider for the first user. The first service provider can be identified for the first user on the basis of the relative distance between the first service provider and the first user (e.g., an absolute distance, a travel distance, an estimated travel time, etc.) and a service class of the service provider (e.g., whether the service class of the service provider matches or exceeds the requested service class of the user). As described herein, the first service provider can be identified for the first user based on an individual optimization of one or more matching parameters of the first user (e.g., estimated wait time of the first user for the matched service provider at the start location). The matching process can also be performed as a batch or group process in which a plurality of users is being matched with a plurality of available service providers. This batch or group provider matching process can be performed by the network system periodically (e.g., during periodic provider matching time periods). In performing the batch provider matching process, the first service provider can be identified for the first user based on a group optimization of one or more aggregate measures of the one or more matching parameters of the plurality of users being matched during the corresponding provider matching time period. For instance, the first service provider can be identified for the first user as part of a group optimization object to minimize the average wait time for the plurality of users being matched during the corresponding provider matching time period.

After the first service provider is pre-request matched with the first user, the network system can hold the first service provider for the first user (step 260). In other words, while the pre-request match is in effect, the network system can classify the first service provider as unavailable for matching with other users in anticipation of receiving a service request from the first user. In addition, the network system can further transmit a pre-request relocation direction (261TX) to the provider device of the first service provider to direct the first service provider to relocate in anticipation of receiving the service request from the first user.

At step 261, in response to receiving the pre-request relocation direction, the provider device can display turn-by-turn directions to navigate to the first service provider the start location of the first user (or a predicted start location if the first user had not yet entered or confirmed a start location within the user application). Alternatively, the pre-request relocation direction can cause the provider device to display directions to navigate the first service provider in a general direction towards the start location (or predicted start location).

At step 262 and after the pre-request match has been identified for the first user, the first user completes the user interface flow to submit a service request 262TX via the user application. The service request 262TX can indicate, for example, a start location, a service class, and/or a service location. In response to receiving the service request 262TX, the network system can transmit an invitation 263TX to the provider device of the first service provider who was pre-request matched with the first user (step 263). The network system can do so automatically without performing additional steps. In alternative implementations, the network system can perform a post-request match for the first user in response to receiving the service request and transmit the invitation 263TX to the service provider identified in the post-request match. In yet another embodiment, the network system can dynamically determine whether to automatically transmit the invitation 263TX to the first service provider or to perform a post-request match in response to receiving the service request 262TX.

In response to receiving the invitation 263TX, the provider device of the first service provider presents a prompt to enable the service provider to accept or decline the invitation. The prompt can be presented as a push notification and/or as an in-app notification within the provider application executing on the provider device. Furthermore, the provider application and/or provider device can be configured to automatically accept or decline the invitation after a timeout or expiration period after the prompt is displayed on the provider device.

At step 265, the service provider accepts the invitation 263TX. This can cause the provider device to transmit an acceptance 265TX to the network system. If the first service provider declined the invitation (or did not accept the invitation before an expiration time) (not illustrated in FIG. 2E), the provider device can transmit a rejection signal to the network system and the network system can identify another service provider for the first user.

In response to receiving the acceptance 265TX from the provider device of the first service provider, the network system can proceed with facilitating the provision of the requested service by the first service provider. For instance, the network system can generate service information (step 266) and transmit a first set of service information 266TX1 to the user device and a second set of service information 266TX2 to the provider device.

In response to receiving the first set of service information 266TX1, the user device can display user service information (step 267). The information can be displayed by the user device within the user application executing on the user device and can include identifying information of the first service provider such as identifying information of the first service provider (e.g., name, picture, etc.), identifying information of the vehicle operated by the first service provider (e.g., license plate information, image, etc.), a rating of the first service provider, an estimated time of arrival of the first service provider to the start location, an estimated time of arrival at the service location, etc. The user device can also present a walking directions route (e.g., a turn-by-turn walking navigation route) for the first user to follow to get to the start location and a route of the first service provider to the start location (e.g., a route overlayed on a map). The user device can also present a push notification in response to receiving the first set of service information 266TX1 that includes a summary of the information described above. In addition, the user device can present one or more user interface features to contact the first service provider (e.g., to send a text or chat message, to place a telephone call, etc.).

In response to receiving the second set of service information 266TX2, the provider device can display provider service information (step 268). The provider information can be displayed within the provider application executing on the provider device and can include turn-by-turn navigation directions to the start location, an estimated time of arrival of the service provider at the start location, identifying information of the first user (e.g., name, image, etc.), and the like. In addition, the provider device can present one or more user interface features to contact the first user (e.g., to send a text or chat message, to place a telephone call, etc.).

Timing Diagrams

Figure 3A:
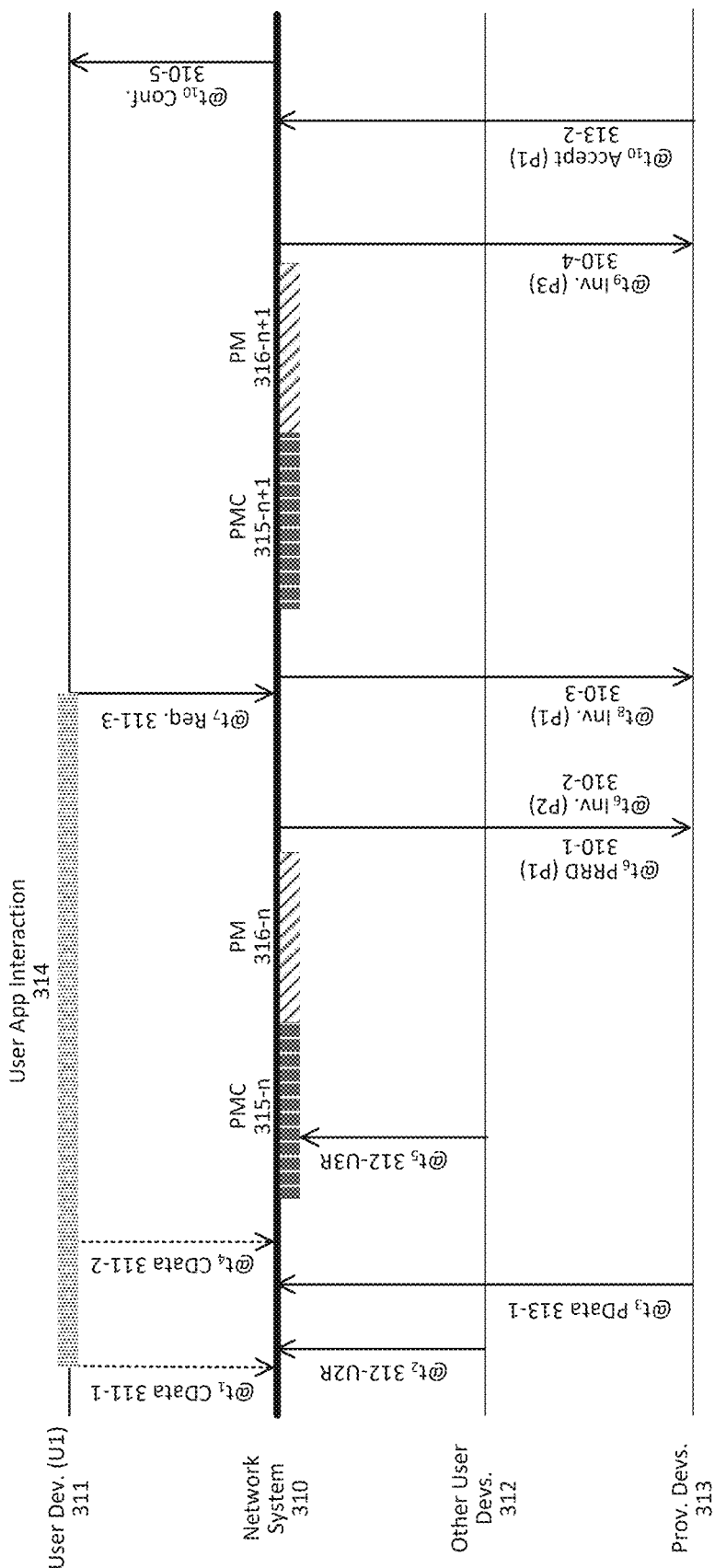
FIGS. 3A and 3B are timing diagrams illustrating example provider matching processes performed by a network system and communications between the network system with user devices and provider devices, according to examples.
Figure 3B:
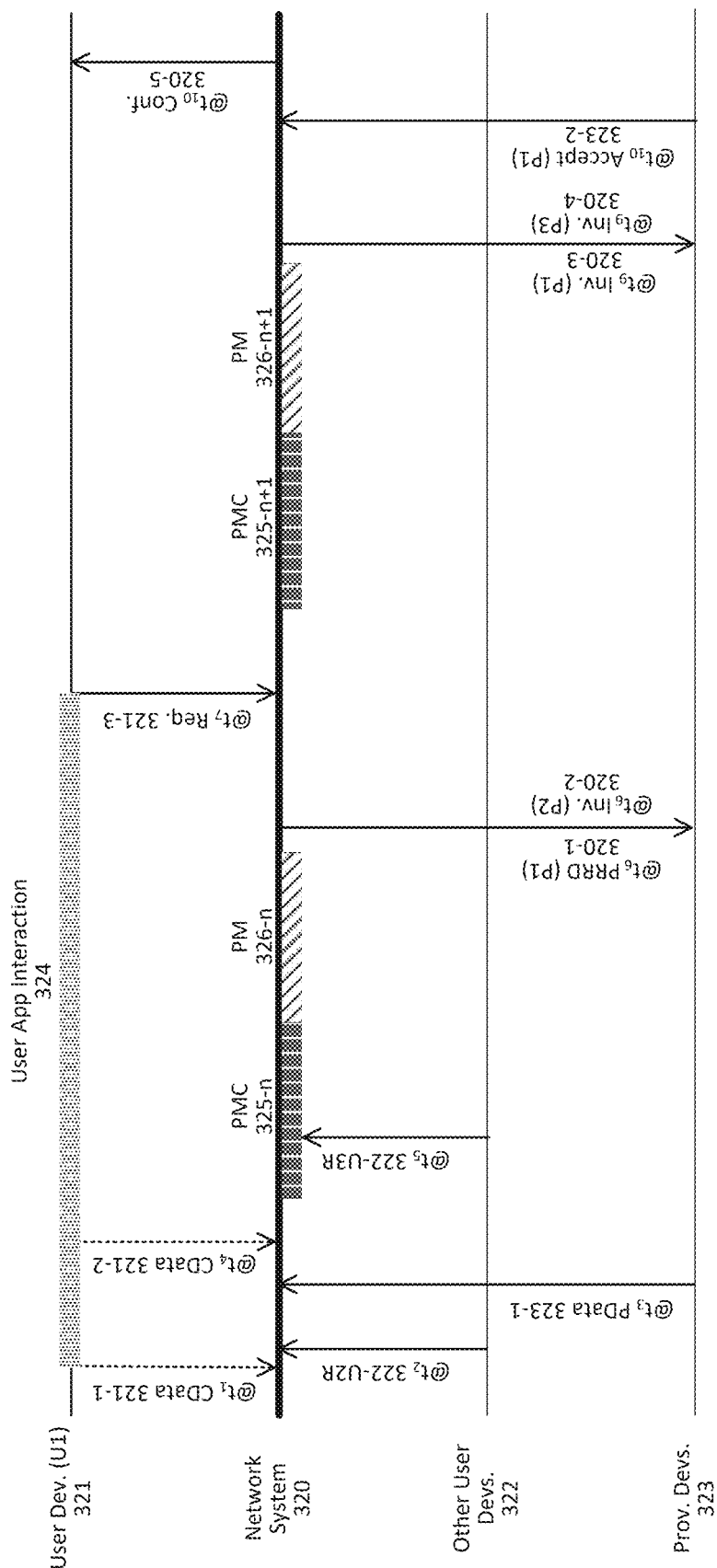

FIGS. 3A and 3B are timing diagrams illustrating example provider matching processes performed by a network system and communications between the network system with user devices and provider devices, according to examples.

Referring to FIG. 3A, the network system 310 can receive at time $t_1$ a first set of context data 311-1 relating to user U1 from U1's user device 311. The context data 311-1 can indicate that U1 has launched the user application on user device 311 and is interacting with the user application. U1's interaction with the user application can be illustrated on the timing diagram as user application interaction 314. The network system 310 can, in response to receiving the first set of context data 311-1, analyze the context data 311-1 to determine whether to perform pre-request matching for U1 during the next provider matching time period PM 316-$n$. Based on the context data 311-1, the network system can determine not to perform pre-request matching for U1. This determination could be made on the basis of, for example, a determined probability, based on the context data 311-1, that U1 would submit a service request within a lookahead window (e.g., within 1 minute of PM 316-$n$) being below a threshold value. For example, the context data 311-1 can indicate that U1 has not progressed sufficiently through the user interface flow of the user application to submit a service request. Or the context data 311-1 can indicate that U1 is not yet near the start location inputted by U1 via the user application. This determination can be made by the network system 310 using a user request submission context model based on the received context data 311-1.

At time $t_2$, the network system receives a service request 312-U2R from a user device of a second user (U2). As illustrated in FIG. 3, user devices in communication with the network system 310 other than the user device 311 of U1 are depicted as other user devices 312. In response to receiving the service request 312-U2R, the network system 310 can determine to include U2 in the set of users for whom provider matching is to be performed during PM 316-$n$.

At time $t_3$, the network system 310 receives provider data 313-1 from provider devices 313 of service providers located within the geographic region managed by the network system 310. The provider data 313-1 can include information such as the current location of each of the service providers, the status of the current service providers with respect to network-based service, etc. The network system 310 can determine the set of providers available for matching with users during PM 316-and based on the received provider data 313-1.

At time $t_4$, the network system receives a second set of context data 311-2 relating to user U1 from the user device 311. In response to receiving the context data 311-2, the network system 310 can again determine whether to perform pre-request matching for U1. The determination can be based on the aggregate context data received since the user began interacting with the user application (e.g., both the first set of context data 311-1 and the second set of context data 311-2). In response to receiving the second set of context data 311-2, the network system 310 can determine to perform pre-request matching for U1. In this case the determination is made in time for the network system to include U1 in the set of users for whom the network system 310 is to perform provider matching during PM 316-$n$ (e.g., before a cutoff time associated with PM 316-$n$). Accordingly, the network system can include U1 in the set of users.

During pre-match computation time period 315-n, the network system 310 can compute matching parameters for the set of users (including U1 in U2) and the set of available service providers.

At time $t_5$ the network system can receive a service request 312-U2R from the user device of a third user (U3). Because the service request 312-U2R is received after the cutoff time associated with PM 316-and, the network system 310 can determine to perform provider matching for U3 during the next provider matching time period after PM 316-n (e.g., PM 316-n+1).

During provider matching 316-end, the network system 310 determines optimal user to provider pairings based on the computed matching parameters for the set of users in the set of available service providers. After the provider matching process is complete, at time $t_6$, the network system 310 can transmit a pre-request relocation direction 310-1 to the provider device of the first service provider (P1) who is pre-request matched with U1. The pre-request relocation direction 310-1 can cause the provider device of P1 to display navigation directions to or towards the start location of U1 (or the current location of U1). At time T6, the network system also transmits an invitation to a second service provider (P2) who is matched with U2.

At time $t_7$, U1 finishes interacting with the user application and submits service request 311-3. In response to receiving the service request 311-3, the network system 310 can automatically convert the pre-request match for U1 to an invitation (e.g., without performing post-request provider matching for U1). Accordingly, at time $t_8$, the network system transmits an invitation 310-3 to the provider device of P1 who was pre-request matched with U1 during provider matching 316-n. Although user application interaction 314 is illustrated to be complete at $t_7$ when U1 submits service request 311-3, it is understood that U1 can continue to interact with the user application executing on user device 311 to, for example, view the status of the service request, identity of the match service provider, a service progress, and the like.

During the subsequent pre-match computation 315-n+1, the network system 310 can compute matching parameters for a second set of users for whom the network system 310 is to perform provider matching during PM 316-n+1. As discussed above, the second set of users includes U3. And during PM 316-n+1, the network system identifies a third service provider (P3) to fulfill the service request submitted by U3. Accordingly, at time $t_9$, the network system transmits an invitation 310-4 to the provider device of P3. At time $t_{10}$, the network system receives an acceptance 313-2 from the provider device of P1. In response to receiving the acceptance 313-2 from the provider device of P1, the network system can transmit a confirmation message 310-5 to the user device 311 of U1.

Referring to FIG. 3B, the provider matching process illustrated in FIG. 3B is identical to the one illustrated and described with respect to FIG. 3A, except that the network system 320 does not automatically convert a pre-request match to a post request match in response to receiving a service request. Thus, for brevity, only the differences between FIG. Three a and FIG. 3B will be discussed. In FIG. 3B, the network system 320 does not transmit an invitation to P1 at time T8. Rather, in response to receiving service request 321-3 from the user device 311, the network system 320 determines to include U1 in the second set of users for whom the network system 320 is to perform provider matching during PM 316-n+1. During PMC 325-n+1, the network system 320 computes matching parameters for the second set of users, including U1 and U3. During PM 326-n+1, the network system performs provider matching based on the computed matching parameters for the second set of users. The network system 320 can, in this process, again identify P1 as the optimal service provider to be matched with U1. Furthermore, the network system 320 can identify the third service provider (P3) to fulfill the service request from U3. Thus, at time $t_9$, the network system 320 transmits an invitation 320-3 to the provider device of P1 to invite P1 to fulfill the service request of U1. Furthermore, at time $t_9$, the network system 320 can transmit invitation 320-4 to the provider device of P3 to invite P3 to fulfill the service request of U3.

Hardware Diagrams

Figure 4:
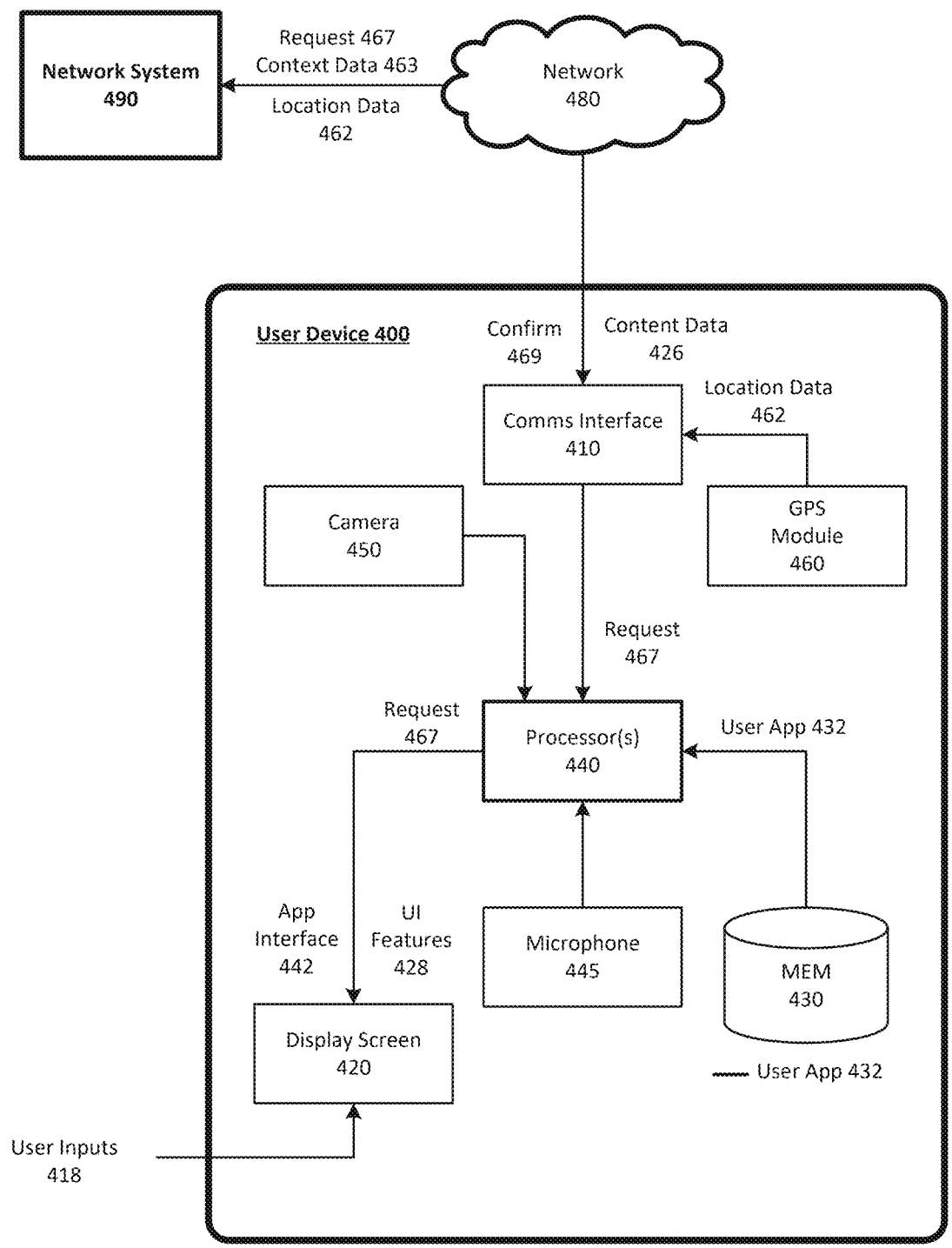
FIG. 4 is a block diagram illustrating an example user device executing and operating a designated user application for communicating with a network system, as described herein.

FIG. 4 is a block diagram illustrating an example user device executing and operating a designated user application for communicating with a network system, according to examples described herein. In many implementations, the user device 400 can comprise a mobile computing device, such as a smartphone, tablet computer, laptop computer, VR or AR headset device, and the like. As such, the user device 400 can include typical telephony features such as a microphone 445, a camera 450, and a communication interface 410 to communicate with external entities using any number of wireless communication protocols. In certain aspects, the user device 400 can store a designated application (e.g., a user application 432) in a local memory 430. In variations, the memory 430 can store additional applications executable by one or more processors 440 of the user device 400, enabling access and interaction with one or more host servers over one or more networks 480.

In response to a user input 418, the user application 432 can be executed by a processor 440, which can cause an application interface 442 to be generated on a display screen 420 of the user device 400. The application interface 442 can enable the user to, for example, check current value levels and availability for the network service. In various implementations, the application interface 442 can further enable the user to select from multiple service types.

The user can generate a service request 467 via user inputs 418 provided on the application interface 442. For example, the user can select a start location, view the various service types and estimated costs, and select a particular service to an inputted destination. In many examples, the user can input the destination prior to pick-up. As provided herein, the user application 432 can further enable a communication link with a network system 490 over the network 480, such as the network system 100 as shown and described with respect to FIG. 1. The processor 440 can generate user interface features 428 (e.g., map, trip progress bar, content cards, etc.) using content data 426 received from the network system 490 over network 480. Furthermore, as discussed herein, the user application 432 can enable the network system 490 to cause the generated user interface features 428 to be displayed on the application interface 442.

The processor 440 can transmit the service requests 467 via a communications interface 410 to the backend network system 490 over a network 480. In response, the user device 400 can receive a confirmation 469 from the network system 490 indicating the selected service provider and vehicle that will fulfill the service request 467 and rendezvous with the user at the start location. In various examples, the user device 400 can further include a GPS module 460, which can provide location data 462 indicating the current location of the requesting user to the network system 490 to, for example, establish the start location and/or select an optimal service provider or autonomous vehicle to service the request 467.

In certain implementations, the user device 400 is configured to generate and transmit, to the network system 490, context data 463 that can be used by the network system to determine a propensity of the user who operates the user device 400 to perform an action via the user application 432. The context data 463 can include user application interaction data indicating interactions, inputs, selections, or a degree of progress through a particular user interface flow (e.g., a user interface flow to submit a service request). The context data 463 can further include sensor data such as barometer or elevation data, ambient light sensor data, accelerometer data, gyroscope data, location data 462, and the like. The context data 463 can further include user application status data indicating, for example, whether the user application 432 is executing as a background process or as a foreground process on the user device 400. The user application status data can further indicate a duration of time the user application 432 has been executing as a foreground process or a duration of time the user application 432 has been executing as a background process. Using the context data 463, the network system 490 can determine, using one or more context models, a propensity of the user to, for example, submit a service request within the next 2 minutes, or cancel a submitted service request 467 once the user is matched by the network system 490 with a service provider in response to the service request 467.

Figure 5:
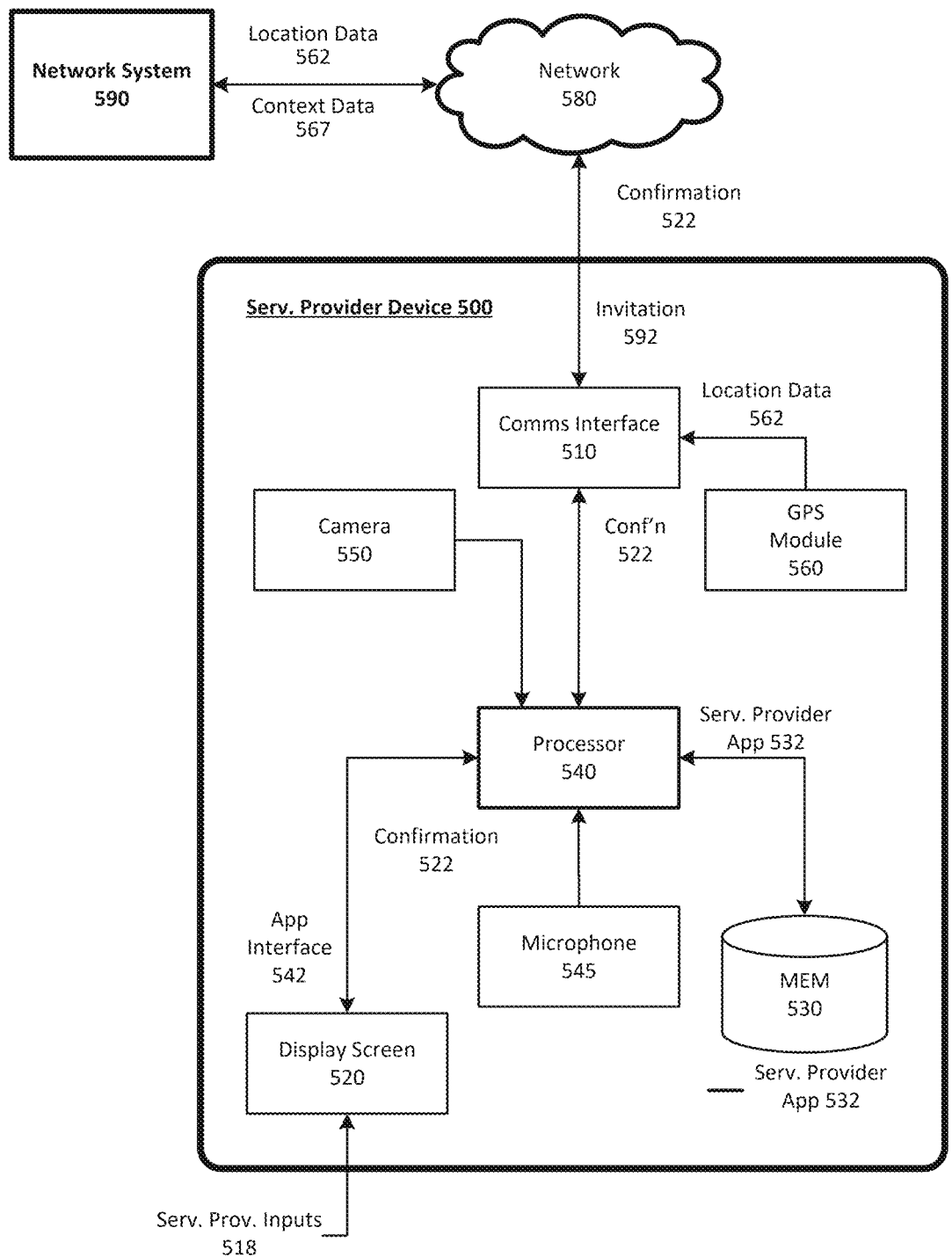
FIG. 5 is a block diagram illustrating an example service provider device executing and operating a designated service provider application for communicating with a network service, according to examples described herein.

FIG. 5 is a block diagram illustrating an example service provider device executing and operating a designated service provider application for communicating with a network service, according to examples described herein. In many implementations, the service provider device 500 can comprise a mobile computing device, such as a smartphone, tablet computer, laptop computer, VR or AR headset device, and the like. As such, the service provider device 500 can include typical telephony features such as a microphone 545, a camera 550, and a communication interface 510 to communicate with external entities using any number of wireless communication protocols. The service provider device 500 can store a designated application (e.g., a service provider app 532) in a local memory 530. In response to a service provider input 518, the service provider app 532 can be executed by a processor 540, which can cause an app interface 542 to be generated on a display screen 520 of the service provider device 500. The app interface 542 can enable the service provider to, for example, accept or reject invitations 592 in order to service requests throughout a given region.

In various examples, the service provider device 500 can include a GPS module 560, which can provide location data 562 indicating the current location of the service provider to the network system 590 over a network 580. Thus, the network system 590 can utilize the current location 562 of the service provider to determine whether the service provider is optimally located to service a particular request. If the service provider is optimal to service the request, the network system 590 can transmit an invitation 592 to the service provider device 500 over the network 580. The invitation 592 can be displayed on the app interface 542, and can be accepted or declined by the service provider. If the service provider accepts the invitation 592, then the service provider can provide a service provider input 518 on the displayed app interface 542 to provide a confirmation 522 to the network system 590 indicating that the service provider will rendezvous with the requesting user at the start location to service the ride request.

In certain implementations, the service provider device 500 is configured to generate and transmit, to the network system 590, context data 563 that can be used by the network system to determine a propensity of the service provider who operates the service provider device 500 to perform an action via the service provider application 532. The context data 563 can include service provider application interaction data indicating interactions or inputs of the service provider with the service provider application 532. The context data 463 can further include sensor data such accelerometer data, gyroscope data, e-compass data, and the like. In certain implementations, the network system 590 can further utilize location data 562 as context data in making certain determinations. Using the context data 563, the network system 590 can determine, using one or more context models, a propensity of the service provider to, for example, decline an invitation corresponding to a service request form a user or cancel an acceptance after the service provider has accepted the invitation.

Figure 6:
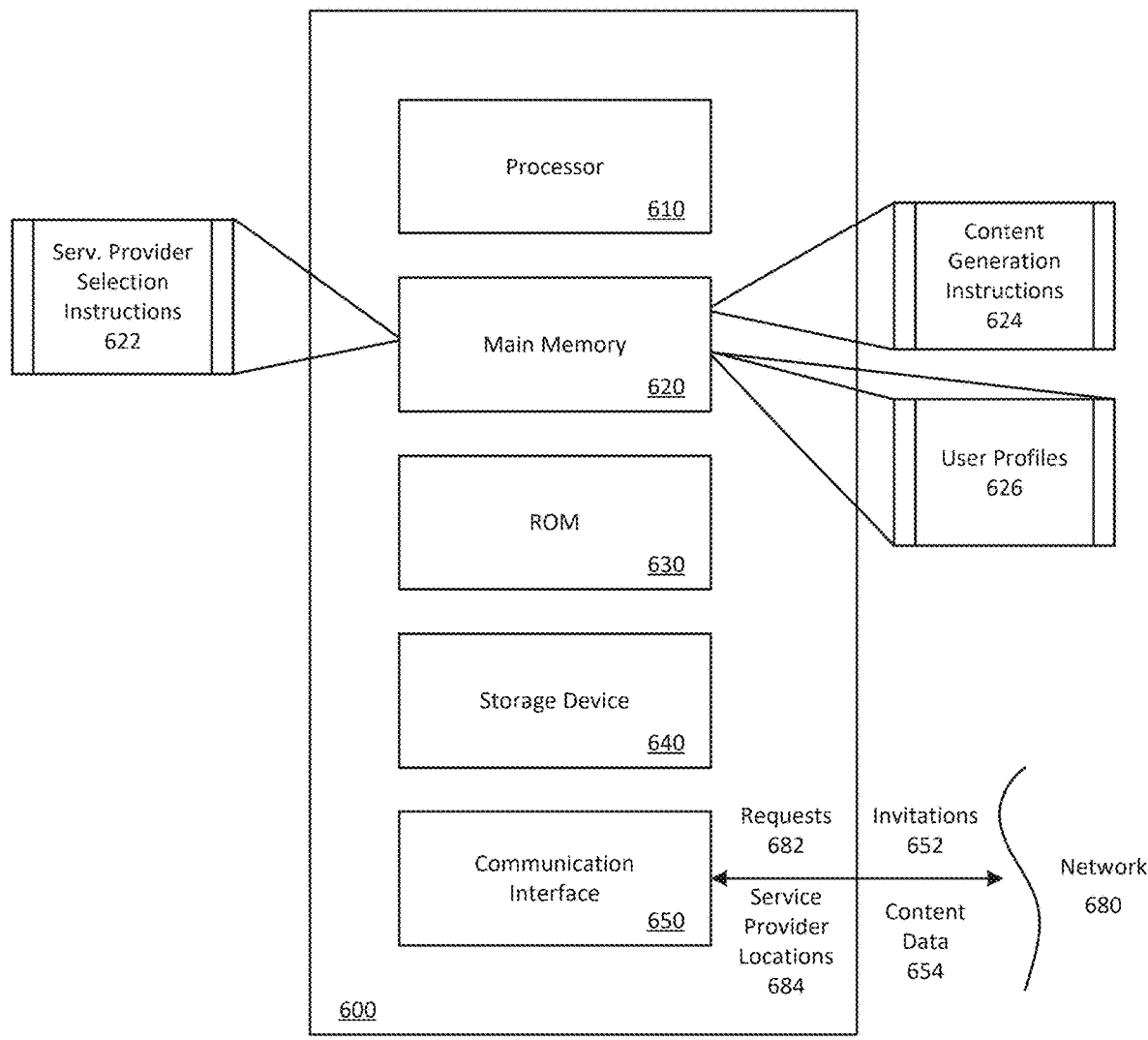
FIG. 6 is a block diagram illustrating a computer system upon which examples described herein may be implemented.

FIG. 6 is a block diagram that illustrates a computer system upon which examples described herein may be implemented. A computer system 600 can be implemented on, for example, a server or combination of servers. For example, the computer system 600 may be implemented as part of a network service, such as described in FIGS. 1 through 6. In the context of FIG. 1, the computer system 600 may be implemented using a computer system 600 such as described by FIG. 6. The network system 100 may also be implemented using a combination of multiple computer systems as described in connection with FIG. 6.

In one implementation, the computer system 600 includes processing resources 610, a main memory 620, a read-only memory (ROM) 630, a storage device 640, and a communication interface 650. The computer system 600 includes at least one processor 610 for processing information stored in the main memory 620, such as provided by a random access memory (RAM) or other dynamic storage device, for storing information and instructions which are executable by the processor 610. The main memory 620 also may be used for storing temporary variables or other intermediate information during execution of instructions to be executed by the processor 610. The computer system 600 may also include the ROM 630 or other static storage device for storing static information and instructions for the processor 610. A storage device 640, such as a magnetic disk or optical disk, is provided for storing information and instructions.

The communication interface 650 enables the computer system 600 to communicate with one or more networks 680 (e.g., cellular network) through use of the network link (wireless or wired). Using the network link, the computer system 600 can communicate with one or more computing devices, one or more servers, and/or one or more self-driving vehicles. In accordance with examples, the computer system 600 receives requests 682 from mobile computing devices of individual users. The executable instructions stored in the memory 630 can include service provider selection instructions 622, which the processor 610 executes to select a service provider to service the request 682. In doing so, the computer system can receive service provider locations 684 of service providers operating throughout the given region, and the processor can execute the service provider selection instructions 622 to identify a plurality of candidate service providers and transmit invitation messages 652 to each of the candidate service providers to enable the service providers to accept or decline the invitations. The processor can further execute the service provider selection instructions 622 to select a service provider among interested candidate service providers to service the request 682.

The executable instructions stored in the memory 620 can also include content generation instructions 624, which enable the computer system 600 to access user profiles 626 and other user information in order to select and/or generate user content 654 for display on the user devices. As described throughout, user content 654 can be generated based on information pertaining to the state of the request (e.g., ETA/destination info). By way of example, the instructions and data stored in the memory 620 can be executed by the processor 610 to implement an example network system 100 of FIG. 1. In performing the operations, the processor 610 can receive requests 682 and service provider locations 684, and submit invitation messages 652 to facilitate the servicing of the requests 682. The processor 610 is configured with software and/or other logic to perform one or more processes, steps and other functions described with implementations, such as described by FIGS. 1 and 2, and elsewhere in the present application.

Examples described herein are related to the use of the computer system 600 for implementing the techniques described herein. According to one example, those techniques are performed by the computer system 600 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computing system for managing a transport service, the computing system comprising:
   one or more processors; and
   one or more memory resources storing instructions that, when executed by the one or more processors of the computing system, cause the computing system to:
      receive, from a first user device of a first user, context data collected by a user application operating on the first user device, the context data including application activity data corresponding to user interactions with the user application on the first user device;
      determine, based on the context data received from the first user device, to perform pre-request matching for the first user during a first provider matching time period that occurs before a service request is submitted from the first user device;
      during the first provider matching time period, matching a plurality of available service providers to a plurality of users, including matching a first service provider to the first user;
      in response to matching the service provider to the first user during the first provider matching time period, classify the first service provider as a pre-request match of the first user that is unavailable for matching with other users of the transport service for a second time period that occurs after the first provider matching time period; and
      in response to receiving the service request for the transport service from the first user device during the second time period, transmit, to a first provider device of the first provider, an invitation to provide transport for the first user;
      wherein the first service provider is unavailable for matching with other users of the transport service other than the first user during the second time period; and
      wherein the invitation is not transmitted to the first provider device after classifying the first service provider as the pre-request match of the first user unless the service request is received from the first user during the second time period.

2. The computing system of claim 1, wherein determining to perform pre-request matching is based on one or more of: an amount of time elapsed since initiation of the user application on the first user device, and an amount of time elapsed since a specific user interface has been presented within the user application.

3. The computing system of claim 1, wherein determining to perform pre-request matching is based on one or more of: whether the user application is running as a foreground process or as a background process on the first user device, and a comparison of respective times the user application has been running as the foreground process and as the background process on the first user device since initiation of the user application.

4. The computing system of claim 1, wherein the context data is transmitted by the first user device to the computing system in response to the first user interacting with the user application operating on the first user device.

5. The computing system of claim 1, wherein determining to perform pre-request matching for the first user is based on the context data and a user request submission context model trained using historical data to link the application activity data to a likelihood of the first user to submit the service request during the second time period.

6. The computing system of claim 1, wherein determining to perform pre-request matching for the first user includes:
   determining, based on the context data, a propensity of the first user to submit the service request during the second time period.

7. The computing system of claim 1, wherein the executed instructions further cause the computing system to compute matching parameters for each of the plurality of users, including a first matching parameter for the first user that is derived from the context data received from the first user device.

8. The computing system of claim 7, wherein matching the plurality of service providers to the plurality of users is based on optimizing an aggregate measure of the matching parameters for the plurality of users.

9. The computing system of claim 7, wherein the matching parameters for each of the plurality of users includes a propensity of a respective user to cancel submitted service requests.

10. The computing system of claim 9, wherein the executed instructions further cause the computing system to compute matching parameters for the plurality of available service providers.

11. The computing system of claim 10, wherein the matching parameters for each of the plurality of available service providers includes a propensity to decline an invitation corresponding to a service request or cancel acceptance of the invitation.

12. A computer-implemented method of managing a transport service, the method being performed by a computing system and comprising:
receiving, from a first user device of a first user, context data collected by a user application operating on the first user device, the context data including application activity data corresponding to user interactions with the user application on the first user device;
determining, based on the context data received from the first user device, to perform pre-request matching for the first user during a first provider matching time period that occurs before any service request is submitted from the first user device;
during the first provider matching time period, matching a plurality of available service providers to a plurality of users, including matching a first service provider to the first user;
in response to matching the first service provider for the first user during the first provider matching time period, classifying the first service provider as a pre-request match of the first user that is unavailable for matching with other users of the transport service for a second time period that occurs after the first provider matching time period; and
in response to receiving the service request for the transport service from the first user device during the second time period, transmitting, to a first provider device of the first provider, an invitation to provide transport for the first user;
wherein the first service provider is unavailable for matching with other users of the transport service other than the first user during the second time period; and
wherein the invitation is not transmitted to the first provider device after classifying the first service provider as the pre-request match of the first user unless the service request is received from the first user during the second time period.

13. The computer-implemented method of claim 12, wherein determining to perform pre-request matching is based on one or more of: an amount of time elapsed since initiation of the user application on the first user device, and an amount of time elapsed since a specific user interface has been presented within the user application.

14. The computer-implemented method of claim 12, wherein determining to perform pre-request matching is based on one or more of: whether the user application is running as a foreground process or as a background process on the first user device, and a comparison of respective times the user application has been running as the foreground process and as the background process on the first user device since initiation of the user application.

15. The computer-implemented method of claim 12, wherein determining to perform pre-request matching for the first user is based on the context data and a user request submission context model trained using historical data to link the application activity data to a likelihood of the first user to submit the service request during the second time period.

16. The computer-implemented method of claim 12, wherein determining to perform pre-request matching for the first user includes determining, based on the context data, a propensity of the first user to submit the service request during the second time period.

17. A non-transitory computer-readable medium storing instructions that, when executed by one or more processors of a computing system for managing a transport service, cause the computing system to:
receive, from a first user device of a first user, context data collected by a user application operating on the first user device, the context data including application activity data corresponding to user interactions with the user application on the first user device;
determine, based on the context data received from the first user device, to perform pre-request matching for the first user during a first provider matching time period that occurs before a service request is submitted from the first user device;
during the first provider matching time period, matching a plurality of available service providers to a plurality of users, including matching a first service provider to the first user;
in response to matching the first service provider to the first user during the first provider matching time period, classify the first service provider as a pre-request match of the first user that is unavailable for matching with other users of the transport service for a second time period that occurs after the first provider matching time period; and
in response to receiving the service request for the transport service from the first user device during the second time period, transmit, to a first provider device of the first provider, an invitation to provide transport for the first user;
wherein the first service provider is unavailable for matching with other users of the transport service other than the first user during the second time period; and
wherein the invitation is not transmitted to the first provider device after classifying the first service provider as the pre-request match of the first user unless the service request is received from the first user during the second time period.

18. The non-transitory computer-readable medium of claim 17, wherein determining to perform pre-request matching for the first user includes determining, based on the context data, a propensity of the first user to submit the service request during the second time period.

19. The computing system of claim 11, wherein matching the plurality of service providers to the plurality of users is based on prioritizing user-to-provider pairings that are less likely to result in cancellations.

20. The computing system of claim 1, wherein determining to perform pre-request matching is based on one or more conditions of the transport service including one or more of a measure of wait times for users in a region and system load.

* * * * *